United States Patent
Ide

(10) Patent No.: US 8,108,057 B2
(45) Date of Patent: Jan. 31, 2012

(54) CONTROL SYSTEM WITH INPUT AVERAGING AND HOLD CONTROL INPUT

(75) Inventor: Hirohito Ide, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 276 days.

(21) Appl. No.: 12/611,166

(22) Filed: Nov. 3, 2009

(65) Prior Publication Data
US 2010/0131116 A1    May 27, 2010

(30) Foreign Application Priority Data
Nov. 21, 2008   (JP) ................................. 2008-297496

(51) Int. Cl.
*G06F 19/00* (2006.01)
*G05B 11/36* (2006.01)

(52) U.S. Cl. ............................... 700/28; 700/29; 700/45
(58) Field of Classification Search .................... 700/28, 700/29, 45
See application file for complete search history.

(56) References Cited

U.S. PATENT DOCUMENTS

| | | | |
|---|---|---|---|
| 5,320,080 A | | 6/1994 | Kadowaki |
| 5,465,697 A | | 11/1995 | Hamburg et al. |
| 6,637,267 B2 * | | 10/2003 | Fiebelkorn et al. ............. 73/587 |
| 6,837,217 B1 * | | 1/2005 | Hoshino et al. ............... 123/399 |
| 7,251,536 B2 * | | 7/2007 | Hashimoto et al. ............. 700/29 |
| 2003/0019297 A1 * | | 1/2003 | Fiebelkorn et al. ............. 73/587 |
| 2003/0139826 A1 * | | 7/2003 | Yasui et al. ..................... 700/31 |
| 2004/0049296 A1 * | | 3/2004 | Hashimoto et al. ............. 700/28 |
| 2005/0072139 A1 * | | 4/2005 | Kato .............................. 60/285 |

FOREIGN PATENT DOCUMENTS

| | | |
|---|---|---|
| EP | 0728929 A2 | 8/1996 |
| JP | 2005-030241 | 2/2005 |

OTHER PUBLICATIONS

"Design, Development, and Testing of Real-Time Feedback Controllers for Semiconductor Etching Processes Using In Situ Spectroscopic Ellipsometry Sensing", Rosen et al, IEEE Transactions on Control Systems Technology, vol. 10, No. 1, Jan. 2002.*

* cited by examiner

*Primary Examiner* — Michael D Masinick
(74) *Attorney, Agent, or Firm* — Squire, Sanders & Dempsey (US) LLP

(57) ABSTRACT

A control system for a plant is provided. A feedback control input is calculated so that a controlled output of the plant coincides with a target value. The feedback control input is averaged to calculate an averaged feedback control input. A hold control input is calculated according to an operating condition of the plant. A corrected hold control input is calculated by combining the hold control input with the averaged feedback control input according to a preset ratio. A control input to the plant is set to the feedback control input in a first state where a control deviation between the controlled output and the target value is greater than a predetermined threshold value, and setting the control input to the corrected hold control input in a second state where the control deviation is equal to or less than the predetermined threshold value. The feedback control input is made to gradually approach to or coincide with the corrected hold control input in the second state.

12 Claims, 15 Drawing Sheets

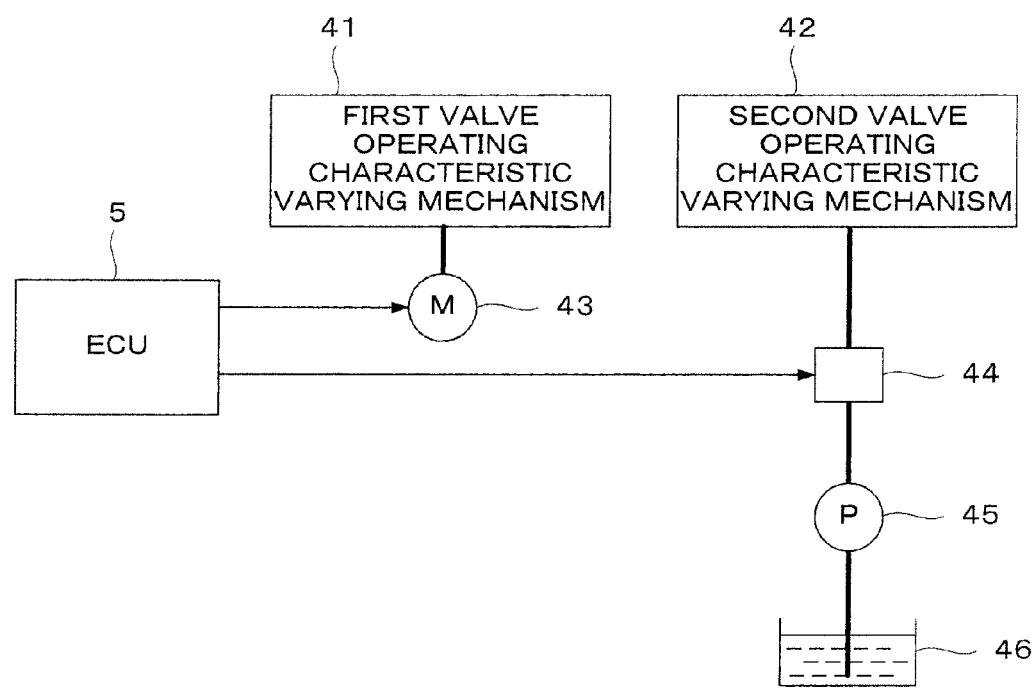

FIG. 3A
FIG. 3B
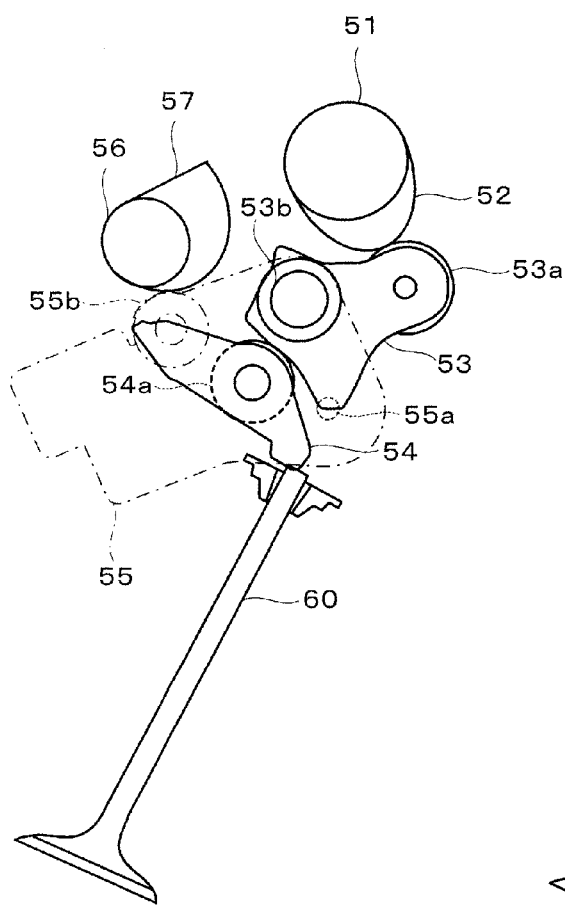
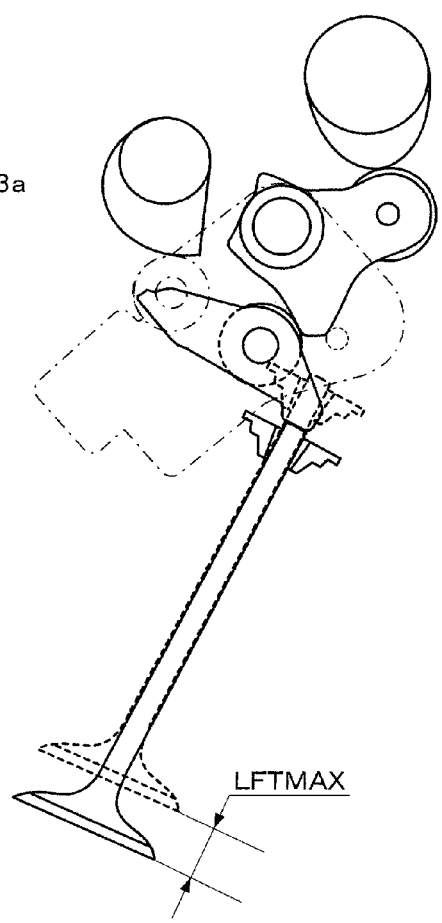

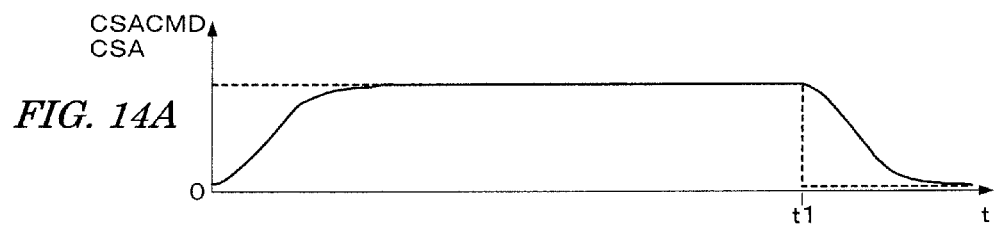
FIG. 14A
FIG. 14B
FIG. 14C
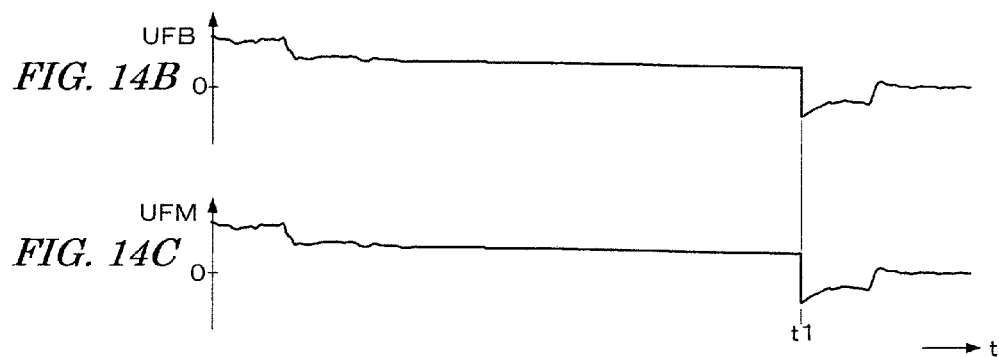
FIG. 15A
FIG. 15B
FIG. 15C
FIG. 15D

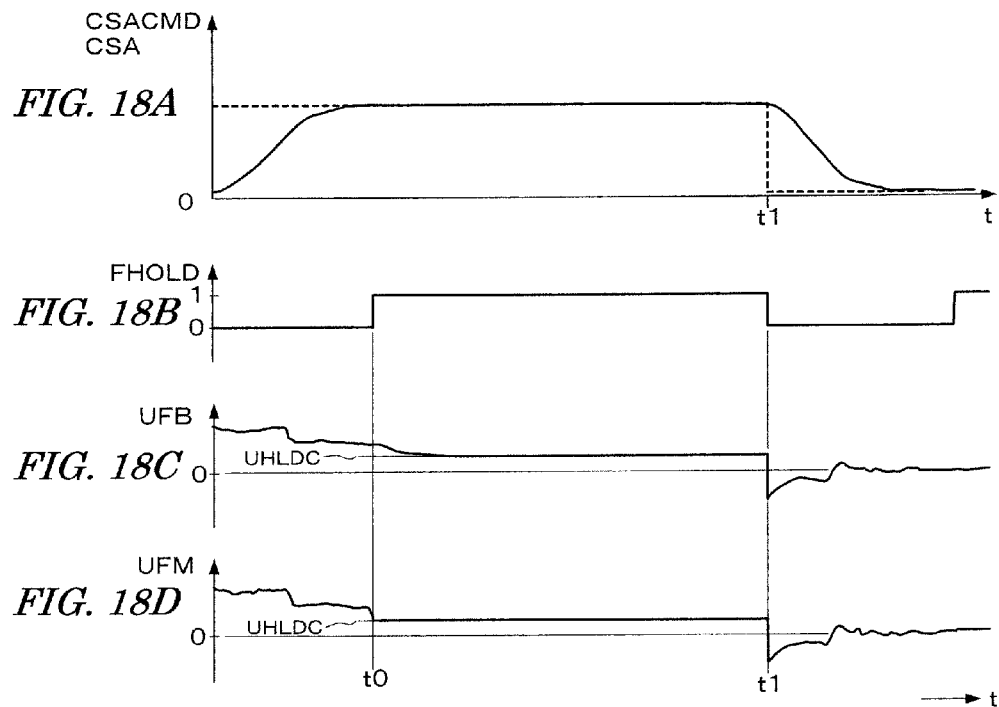
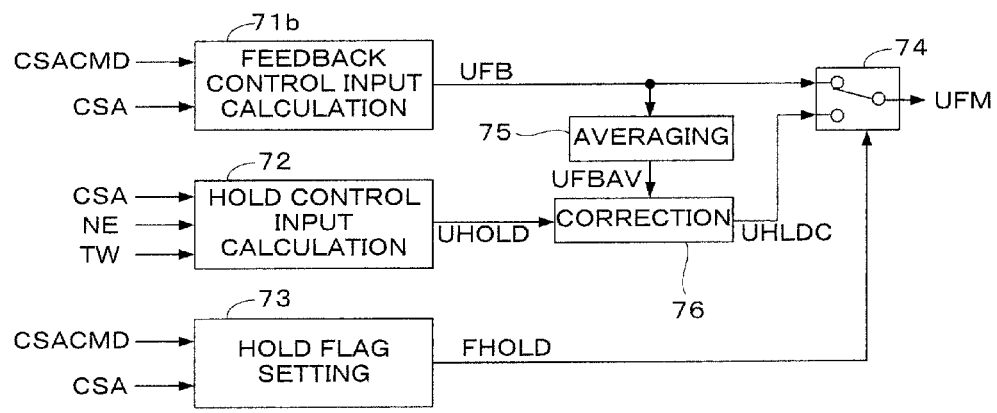

CONTROL SYSTEM WITH INPUT AVERAGING AND HOLD CONTROL INPUT

BACKGROUND

1. Field

The present invention relates to a control system for a plant, and particularly to a control system which controls a plant in a feedback manner so that a controlled output of the plant coincides with a target value, and performs a hold operation of a control input to the plant when a control deviation is comparatively small.

2. Description of the Related Art

Japanese Patent Laid-open No. 2005-30241 (JP '241) discloses a control system for a variable valve-actuating mechanism which continuously varies a lift amount of an intake valve of an internal combustion engine. According to this control system, a feedback control is performed so that an actual operating angle of a control shaft for changing a lift amount is made to coincide with a target operating angle. When an absolute value of a deviation between the actual operating angle and the target operation angle (this deviation will be referred to as "control deviation") is greater than a predetermined value, a feedback control input is calculated by the normal PID (Proportional, Integral, and Differential) feedback control. When the absolute value of the control deviation is equal to or less than the predetermined value, calculation of the feedback control input is inhibited, and the integrating operation of the control deviation is stopped.

Further, JP '241 describes, as a conventional art, a technique in which the integrated control input is output and electric power is supplied to an actuator even after the control deviation becomes "0".

The control system shown in JP '241 is configured on the assumption that the controlled object has a torque transfer mechanism which permits a torque transfer from an output shaft of the actuator to the control shaft, but inhibits a torque transfer from the control shaft to the output shaft of the actuator. According to such a torque transfer mechanism, it is possible to stop supplying electric power to the actuator when the absolute value of the control deviation is equal to or less than the predetermined value. That is, if such a torque transfer mechanism is not adopted, it is necessary to supply electric power to the actuator in order to maintain the control deviation at "0".

When supplying electric power to the actuator in order to maintain the control deviation at "0", there may be a case wherein the power to be supplied to the actuator can be set to a value within a predetermined allowable range, depending on the characteristic of the controlled object. For example, there is a case wherein the electric current to be supplied to the actuator which is necessary to start rotation of the control shaft from a stopped state, can be set to a value within the predetermined allowable range because of a great friction between the control shaft and other components in contact with the control shaft. In such case, it is preferable that the hold current supplied to the actuator for maintaining the control deviation at "0" is set to a value as small as possible. However, if the output of the feedback control device is changed so that the hold current becomes such a small value, a problem may be caused that a time period necessary for making the actual operating angle converge to the target operating angle becomes longer, when the target operating angle changes.

SUMMARY

In certain embodiments, the present invention provides a control system for a plant including feedback control means, averaging means, hold control input calculating means, corrected hold control input calculating means, and control input setting means. The feedback control means calculates a feedback control input (UFB) so that a controlled output (CSA) of the plant coincides with a target value (CSACMD). The averaging means averages the feedback control input (UFB) to calculate an averaged feedback control input (UFBAV). The hold control input calculating means calculates a hold control input (UHOLD) according to an operating condition of the plant. The corrected hold control input calculating means calculates a corrected hold control input (UHLDC) by combining the hold control input (UHOLD) with the averaged feedback control input (UFBAV) according to a preset ratio (KR). The control input setting means sets a control input (UFM) to the plant to the feedback control input (UFB) in a first state where a control deviation (ERR) between the controlled output (CSA) and the target value (CSACMD) is greater than a predetermined threshold value (ERRHX), and setting the control input (UFM) to the corrected hold control input (UHLDC) in a second state where the control deviation (ERR) is equal to or less than the predetermined threshold value (ERRHX). Further, the feedback control means makes the feedback control input (UFB) gradually approach to or coincide with the corrected hold control input (UHLDC) in the second state.

With this configuration, the averaged feedback control input is calculated by averaging the feedback control input, and the hold control input is calculated according to the operating condition of the plant. By combining the hold control input with the averaged feedback control input according to the preset ratio, and the corrected hold control input is calculated. In the first state where the control deviation between the controlled output and the target is greater than the predetermined threshold value, the control input to the plant is set to the feedback control input. In the second state where the control deviation is equal to or less then the predetermined threshold value, the control input is set to the corrected hold control input, the feedback control input is set so as to gradually approach or coincide with the corrected hold control input. For example, by setting the hold control input so that the power supply to the control actuator becomes comparatively small, the corrected hold control input is similarly set (so that the power supply becomes comparatively small), and the power consumption can be reduced. Further, in the second state, by making the feedback control input gradually approach or coincide with the corrected hold control input, good converging performance is obtained when the target value changes, i.e., when the control input is switched from the corrected hold control input to the feedback control input. Further, the set value of the hold control input may deviate from the optimal value, when the operating characteristic of the plant changes due to aging. By using the corrected hold control input to which the averaged feedback control input is reflected according to the preset ratio, the influence of the deviation of the hold control input due to a change in the plant operating characteristic can be reduced to stably perform the hold operation.

Preferably, the feedback control means calculates the feedback control input (UFB) using a proportional term (UP) and an integral term (UI) according to the control deviation (ERR), and calculates the integral term (UI) using a control input deviation (DUFB) which is a difference between the feedback control input (UFB) and the corrected hold control input (UHLDC), in the second state.

With this configuration, the feedback control input is calculated using the proportional term and the integral term which are set according to the control deviation. In the second state where the control input is set to the corrected hold control input, the integral term is calculated using the control input deviation, which is a difference between the feedback control input and the corrected hold control input. According to this calculating method of the integral term, the feedback control input can be made to gradually approach the hold control input.

Specifically, the plant is a valve operating characteristic varying mechanism (41) which continuously changes a lift amount of at least one intake valve of an internal combustion engine, and the valve operating characteristic varying mechanism (41) has a control shaft (56) for changing the lift amount and an actuator (43) for rotating the control shaft (56), wherein a value (IDM) of an electric current supplied to the actuator is calculated according to the control input (UFM), and the controlled output (CSA) is a rotational angle of the control shaft (56).

In this configuration, the valve operating characteristic varying mechanism for continuously changing the lift amount of the intake valve of the internal combustion engine, is the controlled object. If the operating condition of the engine is constant, the lift amount of the intake valve is held at the same value. Therefore, in such operating condition, the value of the electric current supplied to the actuator for rotating the control shaft of the valve operating characteristic varying mechanism, can be reduced. Further, when the target value of the lift amount changes, the actual lift amount can be made to quickly converge to the target value.

BRIEF DESCRIPTION OF THE DRAWINGS

FIG. 2 shows a configuration of a valve operating characteristic varying device shown in FIG. 1;

FIGS. 3A and 3B illustrate a simplified configuration of the first valve operating characteristic varying mechanism shown in FIG. 2;

FIGS. 14A-18D are time charts for illustrating examples of control operations;

FIG. 19 is a block diagram showing a configuration of the output control input calculation module according to a third embodiment of the present invention;

DETAILED DESCRIPTION OF THE PREFERRED EMBODIMENTS

Preferred embodiments of the present invention will now be described with reference to the drawings.

First Embodiment

Figure 1:
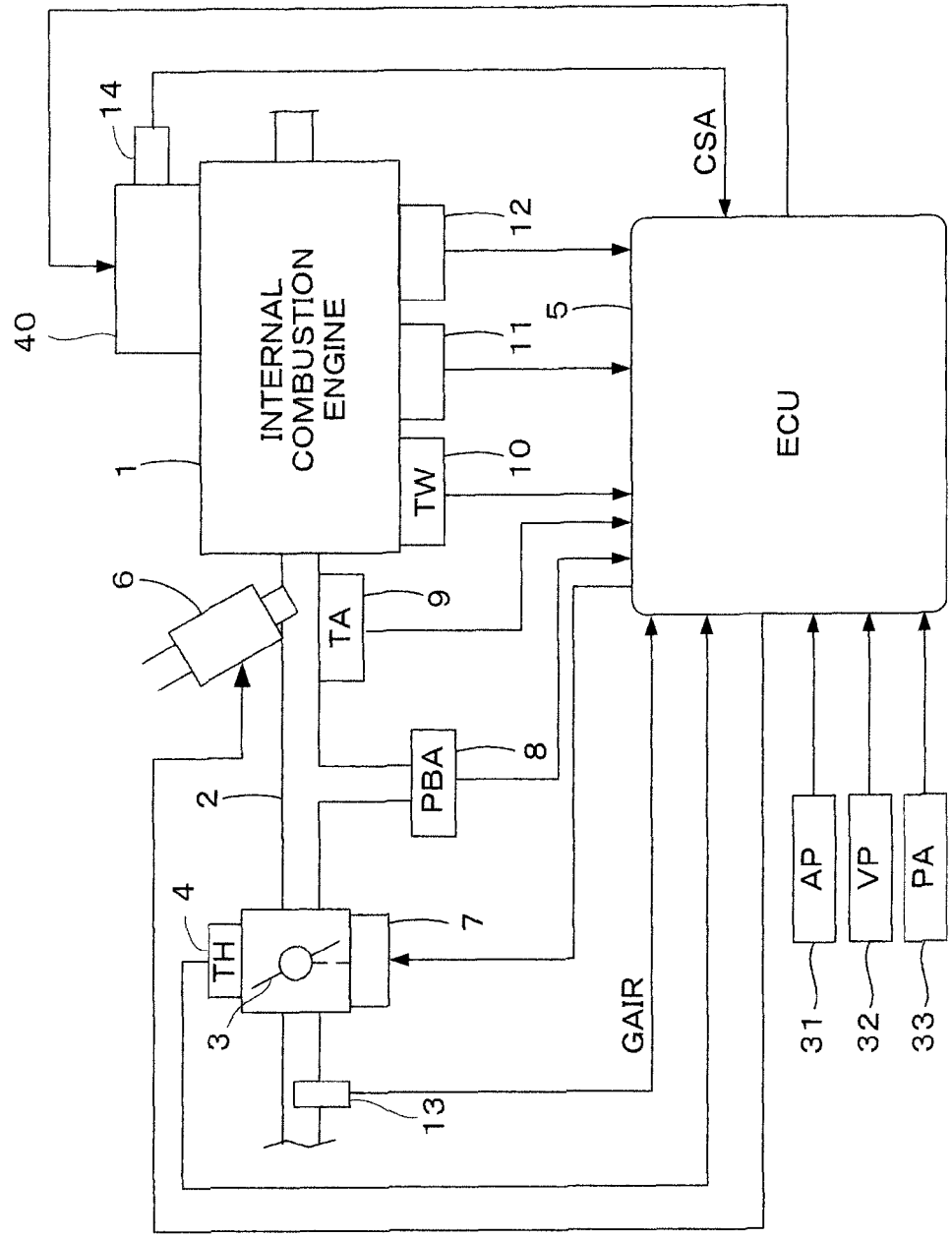
FIG. 1 shows a configuration of an internal combustion engine and a control system therefore according to a first embodiment of the present invention.

FIG. 1 is a schematic diagram showing a configuration of an internal combustion engine and a control system therefore according to a first embodiment of the present invention, and FIG. 2 is a schematic diagram showing a configuration of a valve operating characteristic varying device. Referring to FIG. 1, an internal combustion engine (hereinafter referred to as "engine") 1, having, for example, four cylinders is provided with intake valves and exhaust valves, and cams for driving the intake valves and the exhaust valves. The engine 1 is provided with a valve operating characteristic varying device 40 having a first valve operating characteristic varying mechanism 41 and a second valve operating characteristic varying mechanism 42. The first valve operating characteristic varying mechanism 41 continuously varies the valve lift amount and the opening angle (valve opening period) of the intake valve. The second valve operating characteristic varying mechanism 42 is, in this example, a cam phase varying mechanism for continuously varying the operating phases of the cams for driving the intake valves with reference to a rotational angle of the crank shaft of the engine 1. The second valve operating characteristic varying mechanism 42 varies the operating phase of the cam for driving each intake valve, and consequently varies the operating phase of each intake valve.

The engine 1 can have an intake pipe 2 provided with a throttle valve 3. A throttle valve opening (TH) sensor 4 is connected to the throttle valve 3, can output an electrical signal corresponding to an opening of the throttle valve 3, and can supply the electrical signal to an electronic control unit (referred to as "ECU") 5. An actuator 7 for actuating the throttle valve 3 is connected to the throttle valve 3, and the operation of the actuator 7 is controlled by the ECU 5.

Fuel injection valves 6 are inserted into the intake pipe 2 at locations between the cylinder block of the engine 1 and the throttle valve 3 and slightly upstream of the respective intake valves (not shown). The fuel injection valves 6 are connected to a fuel pump (not shown), and electrically connected to the ECU 5. A valve opening period of each fuel injection valve 6 is controlled by a signal output from the ECU 5.

An intake pressure sensor 8 for detecting an intake pressure PBA and an intake air temperature sensor 9 for detecting an intake air temperature TA are disposed, in this example, downstream of the throttle valve 3. Further, an engine coolant temperature sensor 10 for detecting an engine coolant temperature TW can be mounted on the body of the engine 1. The detection signals from these sensors are supplied to the ECU 5.

A crank angle position sensor 11 and a cam angle position sensor 12 are connected to the ECU 5. The crank angle position sensor 11 is provided to detect a rotational angle of the crankshaft (not shown) of the engine 1, and the cam angle position sensor 12 is provided to detect a rotational angle of a camshaft to which the cams for driving the intake valves of the engine 1 are fixed. A signal corresponding to the rotational angle detected by the crank angle sensor 11 and a signal corresponding to the rotational angle detected by the cam angle position sensor 12 are supplied to the ECU 5. The crank angle position sensor 11 generates one pulse (hereinafter referred to as "CRK pulse") at every constant crank angle period (e.g., a period of 30 degrees) and a pulse for specifying a predetermined angle position of the crankshaft. The cam angle position sensor 12 generates a pulse at a predetermined crank angle position for a specific cylinder of the engine 1 (this pulse will be hereinafter referred to as "CYL pulse"). The cam angle position sensor 12 further generates a pulse at a top dead center (TDC) starting the intake stroke in each cylinder (this pulse will be hereinafter referred to as "TDC pulse"). These pulses are used to control the various timings such as a fuel injection timing and an ignition timing, as well as to detect an engine rotational speed NE. An actual operating phase CAIN of the camshaft is detected based on the correlation between the TDC pulse output from the cam angle position sensor 12 and the CRK pulse output from the crank angle position sensor 11.

An accelerator sensor 31, a vehicle speed sensor 32, and an atmospheric pressure sensor 33 can also be connected to the ECU 5. The accelerator sensor 31 detects a depression amount AP of an accelerator pedal of the vehicle driven by the engine 1 (this depression amount will be hereinafter referred to as "accelerator operation amount"). The vehicle speed sensor 32 detects a running speed (vehicle speed) VP of the vehicle. The atmospheric pressure sensor 33 detects an atmospheric pressure PA. The detection signals from these sensors are supplied to the ECU 5.

The valve operating characteristic varying device 40, as shown in FIG. 2, includes a first valve operating characteristic varying mechanism 41, a second valve operating characteristic varying mechanism 42, a motor 43, and a solenoid valve 44. The first valve operating characteristic varying mechanism 41 continuously varies a lift amount and an opening angle (hereinafter referred to simply as "lift amount LFT") of each intake valve. The second valve operating characteristic varying mechanism 42 continuously varies an operating phase of each intake valve. The motor 43 is provided for continuously changing the lift amount LFT of each intake valve. An opening of the solenoid valve 44 is continuously variable for changing the operating phase of each intake valve. The operating phase CAIN of the camshaft is used as a parameter indicative of the operating phase of the intake valve. A lubricating oil contained in an oil pan 46 is pressurized by an oil pump 45, and supplied to the solenoid valve 44. It is to be noted that a specific configuration of the second valve operating characteristic varying mechanism 42 is described, for example, in Japanese Patent Laid-open No. 2000-227013.

As shown in FIG. 3A, the first valve operating characteristic varying mechanism 41 includes a camshaft 51, a control arm 55, a control shaft 56, a sub-cam 53, and a rocker arm 54.

The camshaft 51 is provided with a cam 52. The control arm 55 is supported by the cylinder head so that the control arm 55 can pivot around a shaft 55a. The control shaft 56 is provided with a control cam 57 which pivots the control arm 55. The sub-cam 53 is supported by the control arm 55 through a supporting shaft 53b so that the sub-cam 53 can pivot around the supporting shaft 53b. The sub-cam 53 is actuated by the cam 52. The rocker arm 54 is actuated by the sub-cam 53 and drives (opens and closes) an intake valve 60. The rocker arm 54 is supported in the control arm 55 so that the rocker arm 54 can pivot.

The sub-cam 53 can have a roller 53a abutting the cam 52, and pivots around the shaft 53b by rotation of the camshaft 51. The rocker arm 54 has a roller 54a abutting the sub-cam 53. The movement of the sub-cam 53 is transmitted to the rocker arm 54 through the roller 54a.

The control arm 55 can have a roller 55b abutting the control cam 57, and pivots around the shaft 55a by rotation of the control shaft 56. In the state shown in FIG. 3A, the intake valve 60 maintains a substantially fully-closed state, since the movement of the sub-cam 53 is not substantially transmitted to the rocker arm 54. On the other hand, in the state shown in FIG. 3B, the movement of the sub-cam 53 is transmitted to the intake valve 60 through the rocker arm 54, and the intake valve 60 opens to a maximum lift amount LFTMAX (e.g., 12 mm).

Therefore, the lift amount LFT of the intake valve 60 can be continuously varied by pivoting the control shaft 56 with the motor 43. In this embodiment, the first valve operating characteristic varying mechanism 41 includes a control shaft rotational angle sensor 14 for detecting a rotational angle (hereinafter referred to as "CS angle") CSA of the control shaft 56. The detected CS angle CSA is used as a parameter indicative of the lift amount LFT.

It is to be noted that the detailed configuration of the first valve operating characteristic varying mechanism 41 is described in Japanese Patent Laid-open No. 2008-25418, the contents of which are hereby incorporated by reference.

Figure 4A:
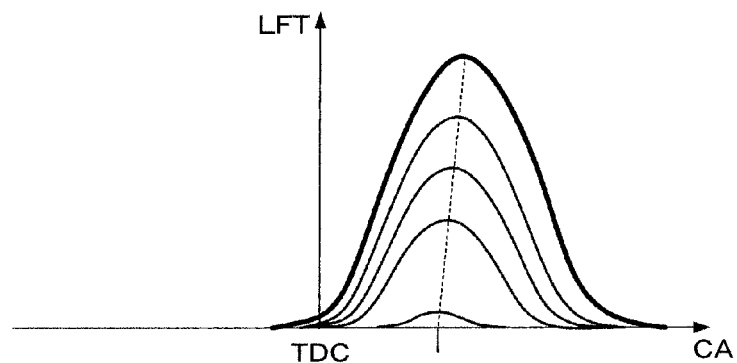
FIGS. 4A and 4B show valve operating characteristics of an intake valve.
Figure 4B:
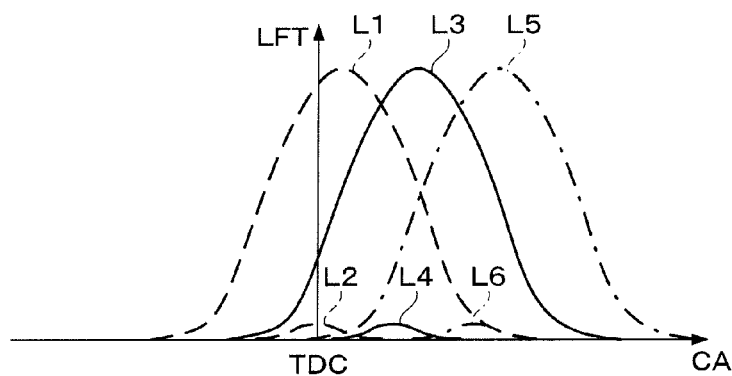

According to the first valve operating characteristic varying mechanism 41, as shown in FIG. 4A, the lift amount LFT (and the opening angle) of the intake valve is varied. Further, according to the second valve operating characteristic varying mechanism 42, the intake valve is driven with a phase from the most advanced phase, shown by the broken lines L1 and L2 in FIG. 4B to the most retarded phase, shown by the dot-and-dash lines L5 and L6 in FIG. 4B, depending on a change in the operating phase CAIN of the camshaft. In FIG. 4B, the characteristics shown by the solid lines L3 and L4 are the center of the variable phase range.

The ECU 5 can include an input circuit having various functions including a function of shaping the waveforms of input signals from the various sensors, a function of correcting the voltage levels of the input signals to a predetermined level, and a function of converting analog signal values into digital signal values. The ECU 5 can further include a central processing unit (hereinafter referred to as "CPU"), a memory circuit, and an output circuit. The memory circuit preliminarily stores various operating programs to be executed by the CPU and the results of computation or the like by the CPU. The output circuit supplies drive signals to the actuator 7, the fuel injection valves 6, the motor 43, and the solenoid valve 44.

The CPU in the ECU 5 controls an opening of the throttle valve 3, controls an amount of fuel to be supplied to the engine 1 (the opening period of each fuel injection valve 6), and controls the valve operating characteristic (intake air flow rate) through the motor 43 and the solenoid valve 44 according to the detected signals from the above-described sensors.

In the lift amount control (CS angle control) of the intake valve, a lift amount command value LFTCMD of the intake valve is calculated according to an engine operating condition, and a CS angle command value CSACMD is calculated according to the lift amount command value LFTCMD. Further, a feedback control of a drive current IMD of the motor 43 is performed so that the detected CS angle CSA coincides with the CS angle command value CSACMD.

Figure 5:
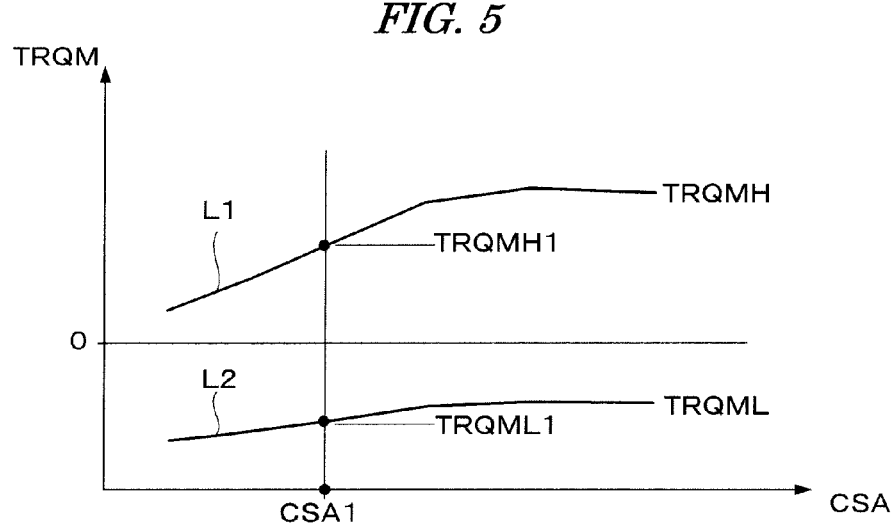
FIG. 5 shows a relationship between a rotational angle (CSA) of a control shaft of the first valve operating characteristic varying mechanism and a motor output torque (TRQM)

FIG. 5 shows a relationship between the CS angle CSA and an output torque TRQM of the motor 43 (which is proportional to the drive current IMD). When the motor output torque TRQM is between a maximum torque TRQMH as shown by the solid line L1 and a minimum torque TRQML (negative value) shown by the solid line L2, the present CS angle CSA is maintained. For example, when the CS angle CSA is equal to an angle CSA1, and the motor output torques TRQM is equal to or less than a maximum torque TRQMH1 and equal to or greater than a minimum torques TRQML1, the CS angle CSA is maintained at the angle CSA1. In other words, the CS angle CSA increases if the motor output torque TRQM exceeds the maximum torque TRQMH1, while the CS angle CSA decreases if the motor output torque TRQM becomes less than the minimum torque TRQML1.

Therefore, when the CS angle command value CSACMD is unchanged, the power consumption can be reduced by setting the motor output torque TRQM to a value as smaller as possible. In this embodiment, the fact that the maximum torque TRQMH and the minimum torque TRQML change due to characteristic variations of the valve operating characteristic varying mechanism 41 is taken into consideration, and the hold current value IDMHLD supplied to the motor 43 is set so as to obtain a hold torque substantially corresponding to an average value of the maximum torque TRQMH and the minimum torque TRQML.

Figure 6:
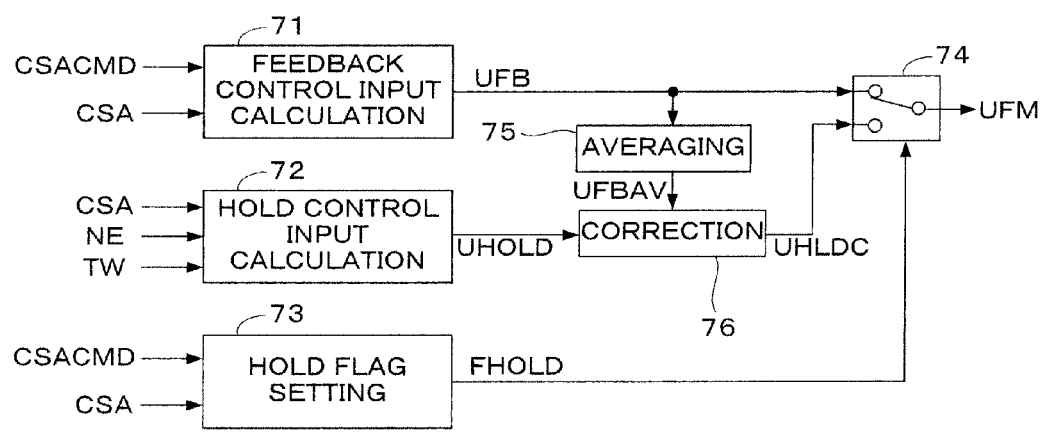
FIG. 6 is a block diagram showing a configuration of a module which calculates an output control input (UFM) for determining a motor drive current.

FIG. 6 is a block diagram showing an example of an output control input calculation module for calculating an output control input UFM which determines the drive current IMD supplied to the motor 43. The functions of the blocks which constitute the module are realized by the operation process executed by the CPU in the ECU 5. The output control input UFM corresponds to the control input to the controlled object.

The output control input calculation module includes a feedback control input calculation block 71, a hold control input calculation block 72, a hold flag setting block 73, a switching block 74, an averaging block 75, and a correction block 76. The feedback control input calculation block 71 calculates the feedback control input UFB so that the detected CS angle CSA coincides with the CS angle command value CSACMD. It is to be noted that the output of the control shaft rotational angle sensor 14 is subjected to a low pass filtering or an epsilon filtering, and the detection value, from which noise components are removed, is used as the CS angle CSA. The epsilon filtering is a known filtering method which effectively attenuates spike-like noises.

The hold control input calculation block 72 can calculate a hold control input UHOLD according to the CS angle CSA, the engine rotational speed NE, and the engine coolant temperature TW. The hold control input UHOLD is an control input corresponding to the hold current IDMHLD described above.

The hold flag setting block 73 sets a hold flag FHOLD according to the CS angle command value CSACMD and the CS angle CSA. The averaging block 75 performs the moving averaging calculation of the feedback control input UFB, to calculate an averaged feedback control input UFBAV. Specifically, the averaged feedback control input UFBAV is calculated by averaging data from a value calculated a predetermined time period (e.g., 10 milliseconds) before to a latest calculated value of the feedback operation amount UFB.

The correction block 76 combines the hold control input UHOLD with the averaged feedback control input UFBAV according to a preset ratio KR, to calculate a corrected hold control input UHLDC. The switching block 74 selects the feedback control input UFB if the hold flag FHOLD is "0"; selects the corrected hold control input UHLDC if the hold flag FHOLD is "1"; and outputs the selected control input as the output control input UFM.

Figure 7:
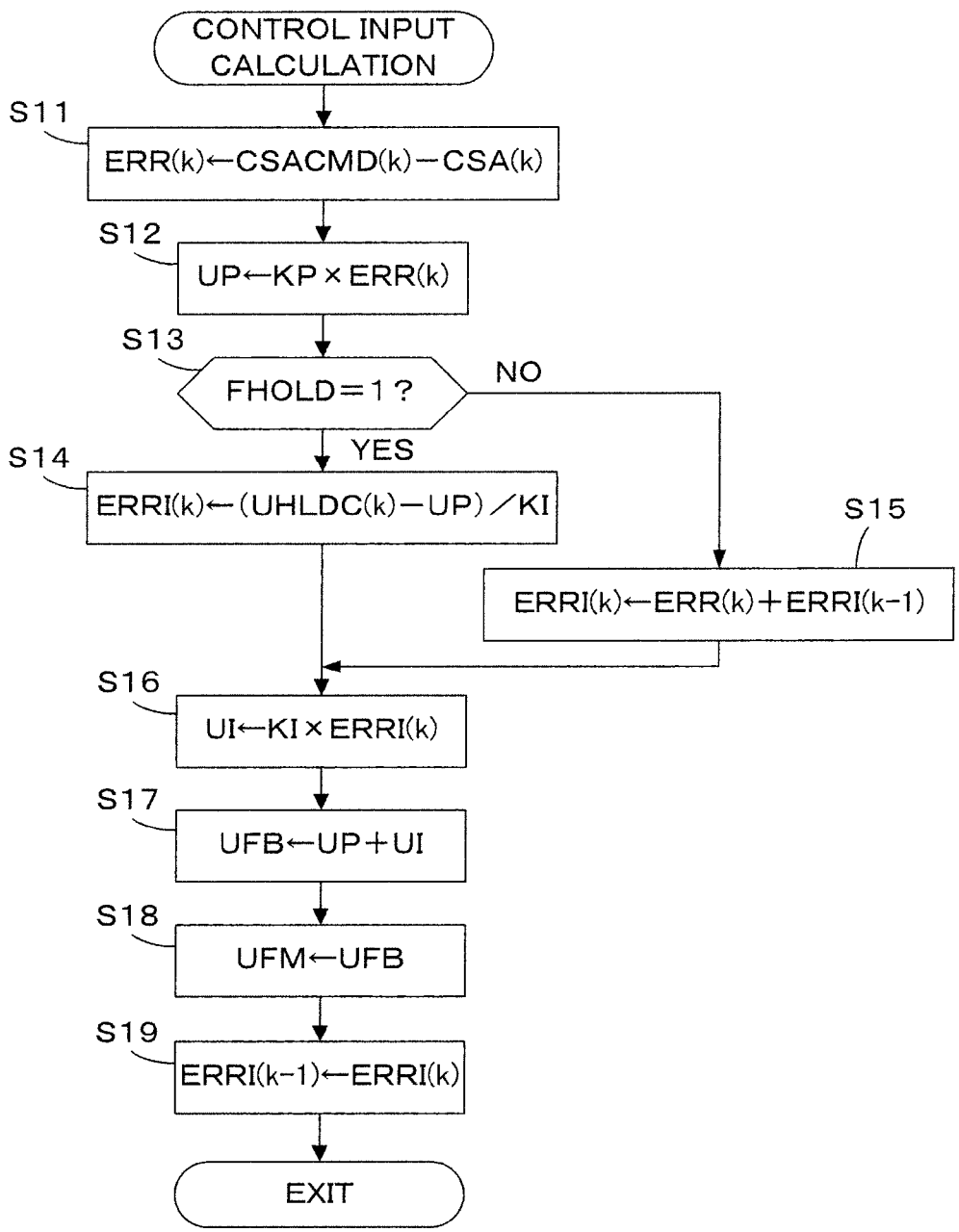
FIG. 7 is a flowchart of a calculation process in the feedback control input calculation block of FIG. 6.

FIG. 7 is a flowchart of a control input calculation process for realizing the functions of the feedback control input calculation block 71 and the switching block 74 of FIG. 6, according to an embodiment of the invention. This process is executed at predetermined time intervals TCAL (e.g., 2 milliseconds) by the CPU in the ECU 5.

In step S11, a control deviation ERR(k) is calculated by the following equation (1). In the equation (1), "k" is a discrete time digitized with the execution period TCAL of this process.

$$ERR(k) = CSACMD(k) - CSA(k) \tag{1}$$

In step S12, the control deviation ERR(k) and a proportional term gain KP are applied to the following equation (2), to calculate a proportional term UP.

$$UP = KP \times ERR(k) \tag{2}$$

In step S13, it is determined whether or not the hold flag FHOLD is equal to "1". If FHOLD is equal to "0", a deviation integrated value ERRI(k) is calculated by the following equation (3) (step S15).

$$ERRI(k) = ERR(k) + ERRI(k-1) \tag{3}$$

If FHOLD is equal to "1" in step S13, the proportional term UP and the corrected hold control input UHLDC are applied to the following equation (4), to set the deviation integrated value ERRI(k) (step S14). In the equation (4), "KI" is an integral term gain.

$$ERRI(k) = (UHOLD(k) - UP)/KI \tag{4}$$

In step S16, an integral term UI is calculated by the following equation (5).

$$UI = KI \times ERRI(k) \tag{5}$$

In step S17, the calculated proportional term UP and integral term UI are applied to the following equation (6), to calculate a feedback control input UFB. The output control input UFM is set to the feedback control input UFB (step S18).

$$UFB = UP + UI \tag{6}$$

In step S19, the preceding value ERRI(k−1) of the deviation integrated value is set to the present value ERRI(k).

By applying the deviation integrated value ERRI(k) calculated by the equation (4) to the equation (5), the integral term UI is obtained by the following equation (7). Therefore, by applying the integral term UI calculated by the equation (7) to the equation (6), the feedback control input UFB becomes equal to the corrected hold control input UHLDC(k).

$$UI = KI \times (UHLDC(k) - UP)/KI \tag{7}$$
$$= UHLDC(k) - UP$$

According to the process of FIG. 7, when the hold flag FHOLD is equal to "0", the feedback control input UFB is set with the normal PI (proportional and integral) control, and the output control input UFM is similarly set. On the other hand, when the hold flag FHOLD is equal to "1", the feedback control input UFB coincides with the corrected hold control input UHLDC(k), and the output control input UFM also coincides with the corrected hold control input UHLDC(k). That is, the output control input UFM is set to the corrected hold control input UHLDC(k).

Figure 8:
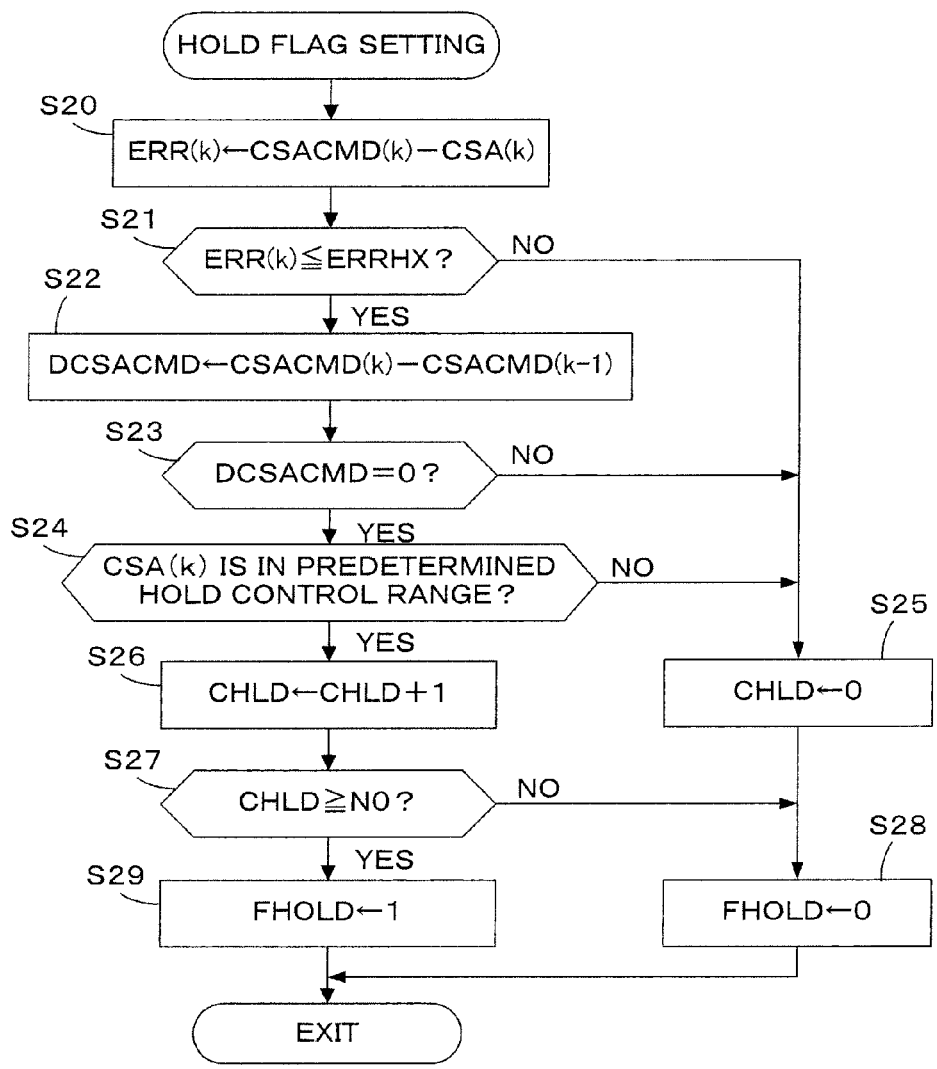
FIG. 8 is a flowchart of a calculation process in the hold flag setting block of FIG. 6.

FIG. 8 is a flowchart of a hold flag setting process for realizing the function of the hold flag setting block 73 of FIG. 6. This process is executed at the predetermined time intervals TCAL by the CPU in the ECU 5.

In step S20, the control deviation ERR(k) is calculated, like step S11 of FIG. 7. In step S21, it is determined whether or not the control deviation ERR(k) is equal to or less than a predetermined threshold value ERRHX. If the answer to step S21 is negative (NO), a counter CHLD is set to "0" (step S25), and the hold flag FHOLD is set to "0" (step S28).

In step S21, if ERR(k) is equal to or less than ERRHX, a command value change amount DCSACMD, which indicates an amount of change in the CS angle command value CSACMD, is calculated by the following equation (8) (step S22).

$$DCSACMD=CSACMD(k)-CSACMD(k-1) \quad (8)$$

In step S23, it is determined whether or not the command value change amount DCSACMD is equal to "0". If the answer to step S23 is affirmative (YES), it is determined whether or not the CS angle CSA(k) is in a predetermined hold control range (step S24).

The drive current IMD cannot be maintained at a constant value when the CS angle command value CSACMD is changing. Accordingly, if the answer to step S23 is negative (NO), the process proceeds to step S25 described above. Further, in this embodiment, even if the drive current IMD is made to be maintained at a constant value, there is an angular range in which the CS angle CSA cannot be maintained at a constant angle due to the torque applied to the control shaft 56 from peripheral components other than the motor 43. Accordingly, the predetermined hold control range is set to a range other than such angular range. Therefore, when the CS angle CSA (k) is not in the predetermined hold control range, the process proceeds to step S25.

If the answer to step S24 is affirmative (YES), i.e., the CS angle command value CSACMD is constant and the CS angle CSA is in the predetermined hold control range, the counter CHLD is incremented by "1" (step S26), and it is determined whether or not the value of the counter CHLD is equal to or greater than a predetermined value N0 (e.g., "5") (step S27). While the answer to step S27 is negative (NO), the process proceeds to step S28. The answer to step S27 becomes affirmative (YES), the process proceeds to the above-described step S29, in which the hold flag FHOLD is set to "1".

Figure 9:
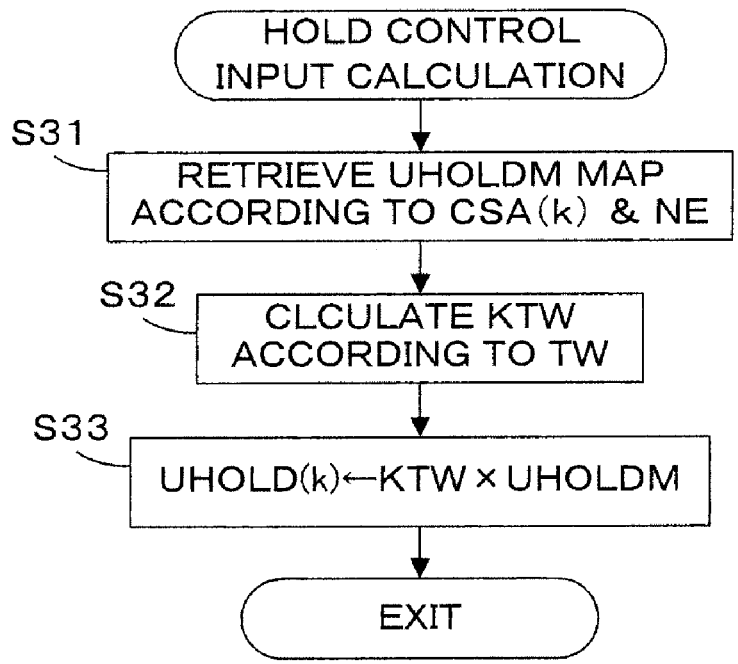
FIG. 9 is a flowchart of a calculation process in the hold control input calculation block of FIG. 6.

FIG. 9 is a flowchart of a hold control input calculation process for realizing the function of the hold control input calculation block 72 of FIG. 6. This process is executed at the predetermined time intervals TCAL by the CPU in the ECU 5.

In step S31, a UHOLDM map is retrieved according to the CS angle CSA(k) and the engine rotational speed NE, to calculate a hold control input map value UHOLDM. The UHOLDM map is set so that the hold control input map value UHOLDM increases as the CS angle CSA(k) increases. Further, since an optimal value of the hold control input changes depending on the engine rotational speeds NE, the hold control input map value UHOLDM is empirically set so as to take an optimal value, according to the engine rotational speed NE.

In step S32, a KTW table is retrieved according to the engine coolant temperature TW, to calculate a correction coefficient KTW. The KTW table is set so that the correction coefficient KTW increases as the engine coolant temperature TW becomes higher.

In step S33, the hold control input map value UHOLDM and the correction coefficient KTW are applied to the following equation (9), to calculate the hold control input UHOLD (k).

$$UHOLD(k)=KTW \times UHOLDM \quad (9)$$

Figure 10:
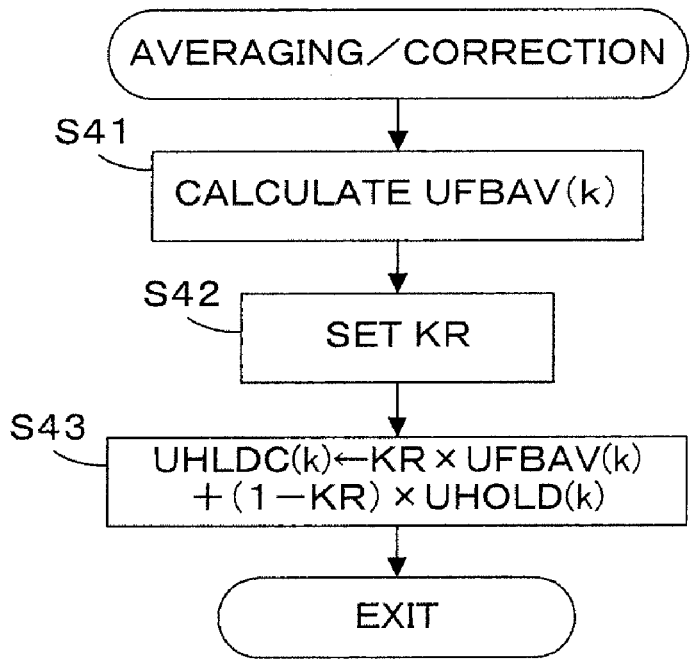
FIG. 10 is a flowchart of the calculation process in the averaging block and the correction block of FIG. 6.

FIG. 10 is a flowchart of a corrected hold control input calculation process for realizing the function of the averaging block 75 and the correction block 76. This process is executed at predetermined time intervals TCAL by the CPU in the ECU 5.

In step S41, the averaged feedback control input UFBAV is calculated by the following equation (11).

$$UFBAV(k) = \frac{1}{NAV} \sum_{i=0}^{NAV-1} UFB(k-i) \quad (11)$$

In step S42, the preset ratio KR is set to a value which is equal to or greater than "0" and equal to or less than "1". Initially (when the engine is new), the preset ratio KR is set to "0", and is made to gradually increase with the time elapsing. Preferably, the maximum ratio KRMAX (maximum value of KR), for example, is set to "0.5".

In step S43, the averaged feedback control input UFBAV, the hold control input UHOLD, and the preset ratio KR are applied to the following equation (12), to calculate the corrected hold control input UHLDC. According to the equation (12), the averaged feedback control input UFBAV affects the corrected hold control input UHLDC more greatly as the preset ratio KR increases.

$$UHLDC(k)=KR \times UFBAV(k)+(1-KR) \times UHOLD(k) \quad (12)$$

As described above, in this embodiment, the hold control input UHOLD is calculated according to the CS angle CSA which is a controlled output. If the control deviation ERR is greater than the predetermined threshold value ERRHX, the output control input UFM, which is a control input to the controlled object, is set to the feedback control input UFB. If the control deviation ERR is equal to or less than the predetermined threshold value ERRHX, the output control input UFM is set to the corrected hold control input UHLDC. When the output control input UFM is set to the corrected hold control input UHLDC, the feedback control input UFB is set so as to coincide with the corrected hold control input UHLDC. In this embodiment, the hold control input UHOLD is set so that the drive current IMD of the motor 43 becomes an average value of the upper limit value and the lower limit value of the required current for maintaining the CS angle at a constant value. Therefore, the electric power supplied to the motor 43 can be reduced. Further, by making the feedback control input UFB coincide with the corrected hold control input UHLDC when the output control input UFM is set to the corrected hold control input UHLDC, good converging performance is attained when the CS angle command value CSACMD changes, i.e., when the output control input UFM is switched to the feedback control input UFB from the corrected hold control input UHLDC.

Further, in this embodiment, the corrected hold control input UHLDC is equal to the hold control input UHOLD if the preset ratio KR is set to "0". Accordingly, sufficient reduction effect of the power consumption can be obtained. Further, by making the preset ratio KR gradually increase with the time elapsing, the averaged feedback control input UFBAV immediately before starting the hold operation is reflected to the corrected hold control input UHLDC even if the value of the hold control input UHOLD deviates from the optimal value due to a change in the characteristic of the first valve operating characteristic varying mechanism 41. Therefore, the influence of the deviation of the hold control input UHOLD due to the characteristic change in the first valve operating characteristic varying mechanism 41 can be reduced, thereby making it possible to stably perform the hold operation.

In this embodiment, the ECU 5 constitutes the feedback control means, the averaging means, the hold control input calculating means, the corrected hold control input calculating means, and the control input setting means. Specifically, the feedback control input calculation block 71 of FIG. 6 corresponds to the feedback control means, the averaging block 75 corresponds to the averaging means, the hold control input calculation block 72 corresponds to the hold control input calculating means, and the correction block 76 corresponds to the corrected hold control input calculating means. Further, the hold flag setting block 73 and the switching block 74 correspond to the control input setting means. That is, steps S11, S12, S16, and S17 of FIG. 7 correspond to the feedback control means, steps S13 to S15 and S18 of FIG. 7, and the process of FIG. 8 correspond to the control input setting means, the process of FIG. 9 corresponds to the hold control input calculating means, and the process of FIG. 10 corresponds to the averaging means and the corrected hold input calculating means.

The averaged feedback control input UFBAV may alternatively be calculated by performing the low pass filtering or the Epsilon filtering instead of the above-described moving averaging calculation to the feedback control input UFB.

Second Embodiment

Figure 11:
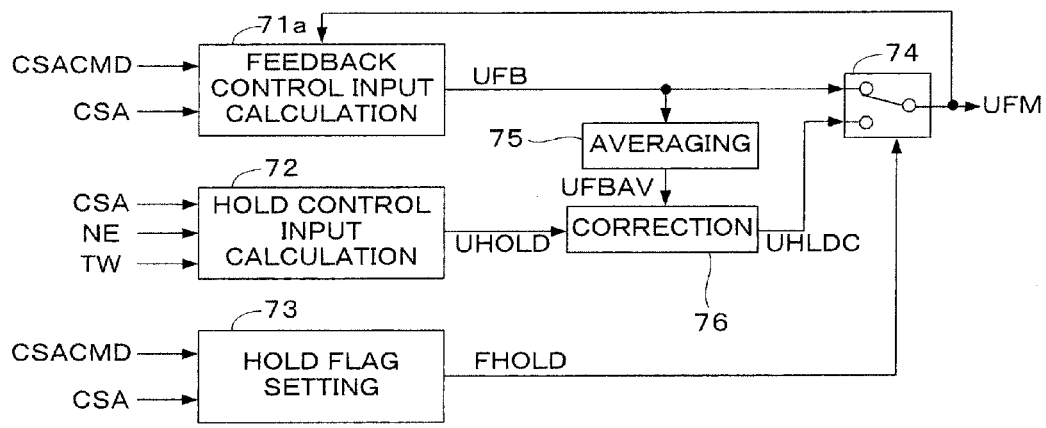
FIG. 11 is a block diagram showing a configuration of the output control input calculation module according to a second embodiment of the present invention.

FIG. 11 is a block diagram showing a configuration of an output control input calculation module according to a second embodiment of the present invention. The configuration shown in FIG. 11 is obtained by changing the feedback control input calculation block 71 shown in FIG. 6 to a feedback control input calculation block 71a. In this configuration, the output control input UFM is fed back to the feedback control input calculation block 71a.

Figure 12:
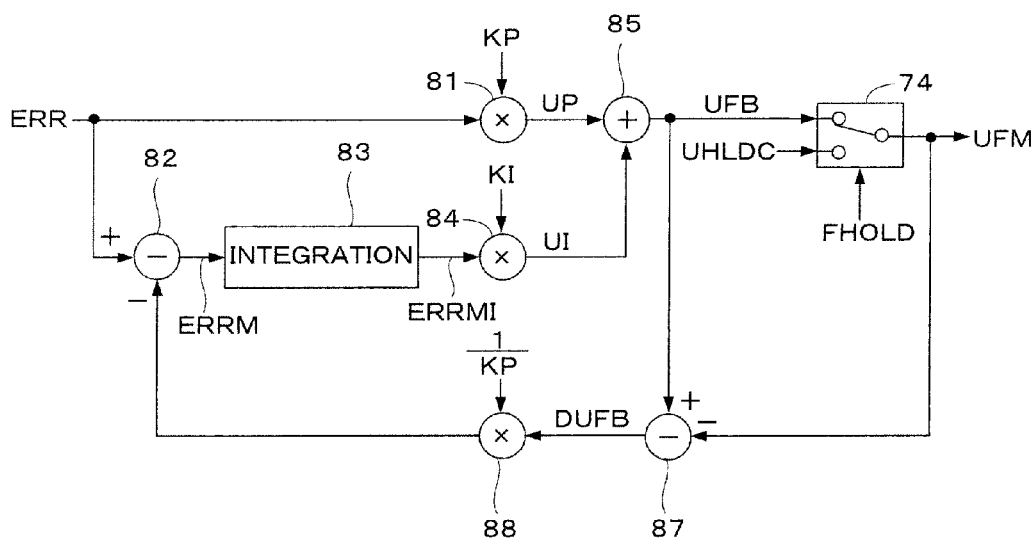
FIG. 12 is a block diagram showing a configuration of the feedback control input calculation block of FIG. 11.

FIG. 12 is a block diagram for illustrating the configuration of the feedback control input calculation block 71a shown in FIG. 11. The feedback control input calculation block 71a includes multiplying blocks 81, 84, and 88, subtracting blocks 82 and 87, an adding block 85, and an integration block 83. This configuration is obtained by adding the subtracting blocks 82 and 87 and the multiplying block 88 to the feedback control input calculation block 71 which consists of the multiplying blocks 81 and 84, the integration block 83, and the adding block 85, and performs the normal PI control.

The subtracting block 87 subtracts the output control input UFM from the feedback control input UFB, to calculate a control input deviation DUFB. The multiplying block 88 multiplies the reciprocal (1/KP) of the proportional term gain KP with the control input deviation DUFB. The subtracting block 82 subtracts (DFUB/KP) from the control deviation ERR, to calculate a modified control deviation ERRM. The integration block 83 integrates the modified control deviation ERRM, to calculate a modified control deviation integrated value ERRMI. The multiplying block 84 multiplies the integral term gain KI with the modified control deviation integrated value ERRMI, to calculate an integral term UI. The multiplying block 81 multiplies the proportional term gain KP with the control deviation ERR, to calculate a proportional term UP. The adding block 85 adds the proportional term UP and the integral term UI, to calculate the feedback control input UFB.

By expressing the feedback control input UFB using a transfer function of a continuous time system based on FIG. 12, the equations (20) and (21) are obtained. In the equation (20), "s" is the Laplace operator.

$$UFB = KP \times ERR + KI \times ERRM/s \qquad (20)$$

$$ERRM = ERR - (UFB - UFM)/KP \qquad (21)$$

By applying the feedback control input UFB expressed by the equation (20) to the equation (21), the following equation (22) is obtained.

$$ERRM = \frac{s}{KP \cdot s + KI} UFM \qquad (22)$$

The transfer function in the equation (22) from the output control input UFM to the modified control deviation ERRM is a transfer function of high-pass filtering, and a steady-state gain of the transfer function is equal to "0". Therefore, if the output control input UFM is set to the corrected hold control input UHLDC, the corrected control deviation ERRM gradually approaches "0" regardless of the control deviation ERR, and the feedback control input UFB gradually approaches the corrected hold control input UHLDC. It is to be noted that when UFM is equal to UFB, the modified control deviation ERRM becomes equal to the control deviation ERR, and the normal PI control operation is performed.

By adopting the configuration as shown in FIG. 12 wherein the control deviation ERR is modified according to the control input deviation DUFB which is a difference between the feedback control input UFB and the output control input UFM, to calculate the modified control deviation ERRM; and the modified control deviation ERRM is input to the integration block 83, the feedback control input UFB can be made to gradually approach the corrected hold control input UHLDC (i.e., the integral term UI can be prevented from being saturated) when the output control input UFM is set to the corrected hold control input UHLDC. Consequently, the CS angle CSA can be quickly made to coincide with the CS angle command value CSACMD immediately after the hold flag FHOLD has changed from "1" to "0", i.e., immediately after restarting the normal feedback control operation.

Figure 13:
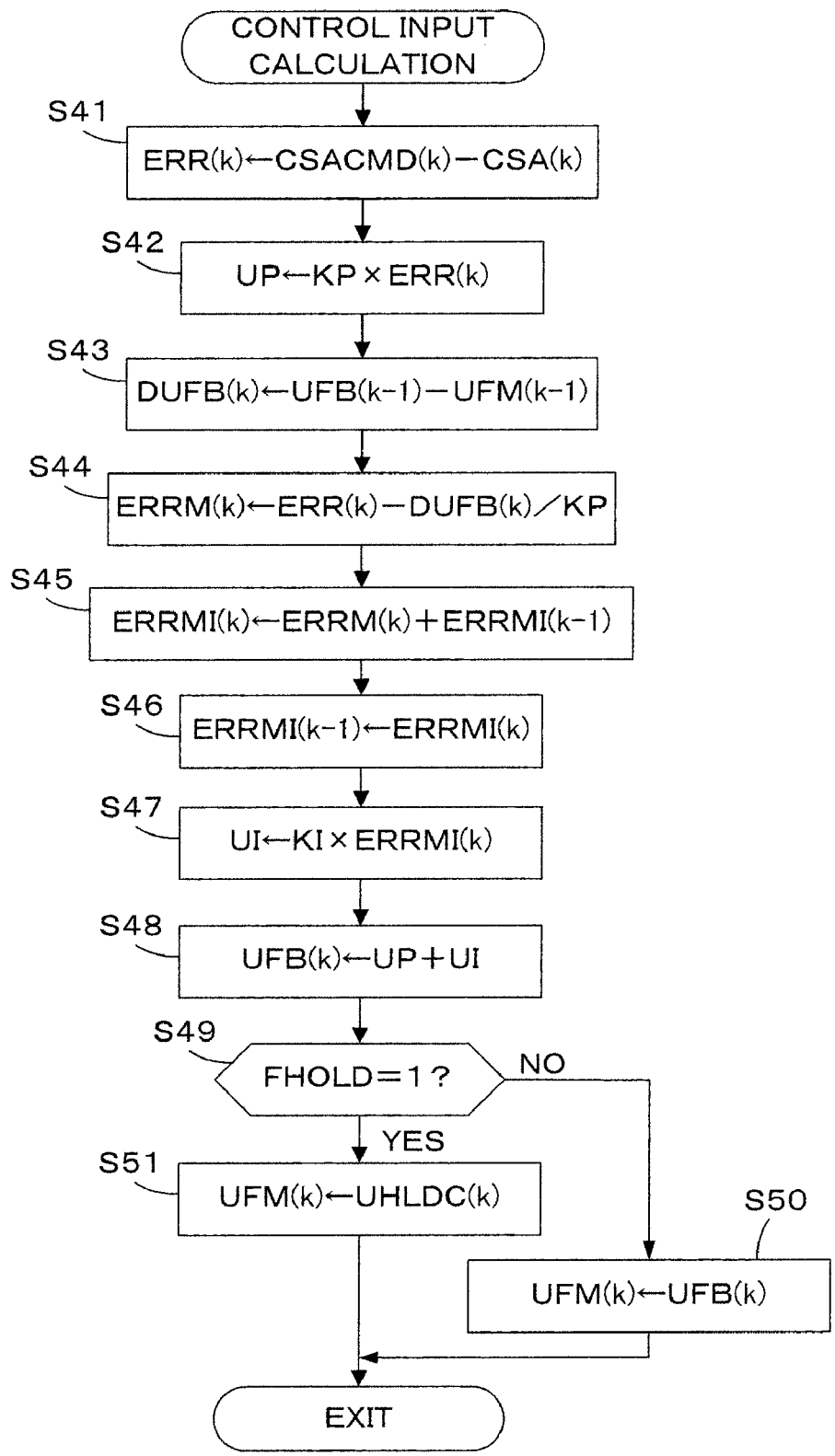
FIG. 13 is a flowchart of a calculation process in the feedback control input calculation block of FIG. 11.
Figure 16A:
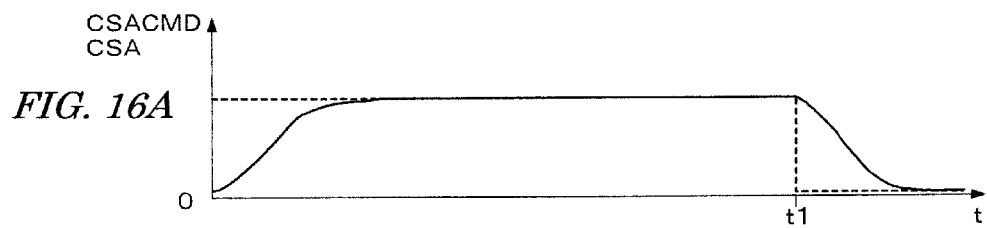
Figure 16B:
Figure 16C:
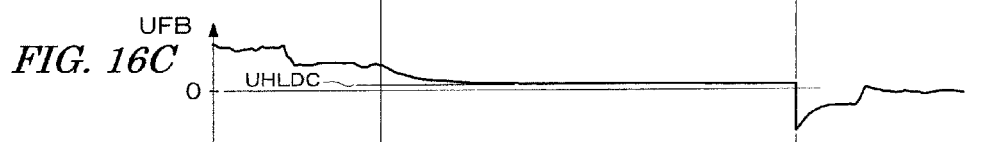
Figure 16D:
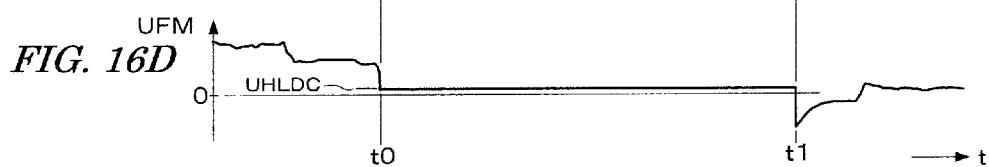
Figure 17A:
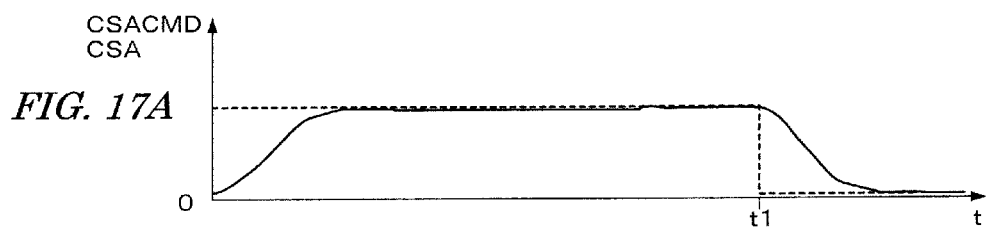
Figure 17B:
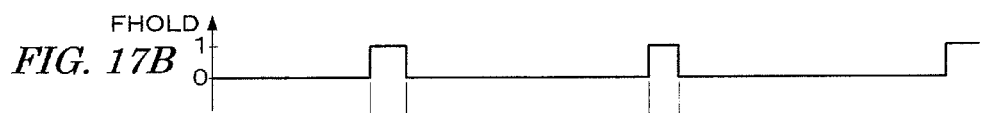
Figure 17C:
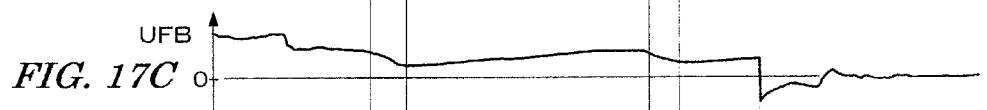
Figure 17D:
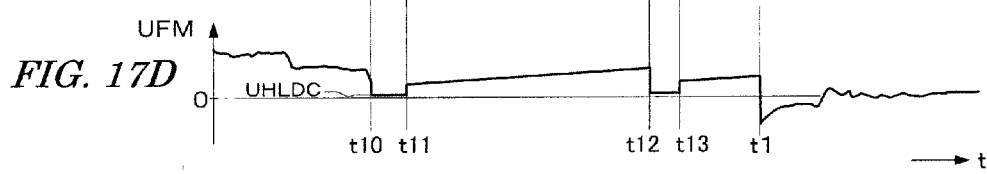

FIG. 13 is a flowchart of a process for realizing the function of the block diagram shown in FIG. 12. This process is executed at the predetermined intervals TCAL by the CPU in the ECU 5.

Steps S41 and S42 are respectively the same as steps S11 and S12 of FIG. 7, and the control deviation ERR(k) and the proportional term UP are calculated.

In step S43, the control input deviation DUFB(k) is calculated by the following equation (23).

$$DUFB(k) = UFB(k-1) - UFM(k-1) \qquad (23)$$

In step S44, the modified control deviation ERRM(k) is calculated by the following equation (24). In step S45, the modified control deviation ERRM(k) is integrated by the following equation (25), to calculate the modified deviation integrated value ERRMI(k).

$$ERRM(k)=ERR(k)-DUFB(k)/KP \quad (24)$$

$$ERRMI(k)=ERRM(k)+ERRMI(k-1) \quad (25)$$

In step S46, the preceding value of the modified deviation integrated value ERRMI(k−1) is set to the present value ERRMI(k). In step S47, the integral term gain KI is multiplied with the modified deviation integrated value ERRMI(k), to calculate the integral term UI. In step S48, the proportional term UP and the integral term UI are added, to calculate the feedback control input UFB(k).

In step S49, it is determined whether or not the hold flag FHOLD is equal to "1". IF FHOLD is equal to "0", the output control input UFM(k) is set to the feedback control input UFB(k) (step S50). On the other hand, if the hold flag FHOLD is equal to "1", the output control input UFM(k) is set to the corrected hold control input UHLDC(k) (step S51).

As described above, in this embodiment, when the output control input UFM is set to the corrected hold control input UHLDC, the integral term UI is calculated by using the control input deviation DUFB which is the difference between the feedback control input UFB and the corrected hold control input UHLDC, and the feedback control input UFB is controlled so as to gradually approach the corrected hold control input UHLDC. Therefore, the CS angle CSA which is the controlled output can be made to quickly converge to the CS angle command value CSACMD, immediately after the CS angle command value CSACMD is changed, and the hold flag FHOLD is changed to "0".

Next, examples of the above described control operation will be described with reference to FIGS. 14A to 18D. In FIGS. 14A to 18D, changes in the CS angle command value CSACMD, the CS angle CSA, the hold flag FHOLD, the feedback control input UFB, and the output control input UFM are shown. In FIGS. 14A, 15A, 16A, 17A, and 18A, the dashed line indicates the CS angle command value CSACMD, and the solid line indicates the CS angle CSA. It is to be noted that examples shown in FIGS. 15A to 16D correspond to the initial condition where the preset ratio KR applied to correct the hold control input UHOLD is set to "0", and the corrected hold control input UHLDC is equal to the hold control input UHOLD.

FIGS. 14A to 14D show an example in which the hold operation of the output control input UFM is not performed when the CS angle command value CSACMD is constant (before time t1). The motor drive current IDM is approximately 20[A] corresponding to the output control input UFM, which means that the power consumption is comparatively great.

FIGS. 15A to 15D shows an example in which the hold flag FHOLD is set to "1" at time t0, and the hold operation is started. In this example, the feedback control input calculation block continues the normal PI control in the hold operation (FHOLD=1) to calculate the feedback control input UFB. On the other hand, the output control input UFM is set to the corrected hold control input UHLDC (FIG. 15D), thereby suppressing the motor drive current IDM to about 5[A]. However, the feedback control input UFB takes a value which is different from the output control input UFM (which is equal to the corrected hold control input UHLDC) as shown in FIG. 15C, since the integral term UI becomes saturated. Consequently, a control delay occurs (refer to the portion A of FIG. 15A) immediately after time t1 when the hold flag FHOLD is switched from "1" to "0".

FIGS. 16A to 16D show an example in which the control of this embodiment is applied. After time t0 when the hold operation is started, the feedback control input UFB gradually approaches the output control input UFM (which is equal to the corrected hold control input UHLDC), and the feedback control input coincides with the output control input UFM before time t1. Consequently, the control delay as shown in FIG. 15A does not occur immediately after time t1, and good converging characteristic is obtained.

FIGS. 17A to 17D show an example of the control operation when the characteristic of the first valve operating characteristic varying mechanism 41 has changed due to aging and the preset ratio KR is set to "0". In this example, the hold flag FHOLD is set to "1" at time t10. However, since the value of the output control input UFM (which is equal to the corrected hold control input UHLDC) has deviated from the optimal value, the hold operation cannot be maintained and the hold flag FHOLD is returned to "0" at time t11. Accordingly, the normal feedback control is restarted, and the hold flag FHOLD is set to "1" at time t12. However, the hold flag FHOLD is likewise returned to "0" again at time t13. Therefore, the hold operation cannot be performed stably.

FIGS. 18A to 18D show an example of the control operation when the preset ratio KR is set to "0.5" in the same condition of the example of FIGS. 17A to 17D. In this example, the hold flag FHOLD is set to "1" at time t0 and the state is maintained until time t1, to normally perform the hold operation. It is because the averaged feedback control input UFBAV is reflected to the corrected hold control input UHLDC according to the preset ratio KR. In this example, although the output control input UFM becomes greater than that of FIG. 17D, the hold operation can be performed stably.

In this embodiment, the feedback control input calculation block 71a corresponds to the feedback control means.

Third Embodiment

FIG. 19 is a block diagram showing a configuration of an output control input calculation module according to a third embodiment of the present invention. The configuration shown in FIG. 19 is obtained by changing the feedback control input calculation block 71 of the configuration shown in FIG. 6 to a feedback control input calculation block 71b.

Figure 20:
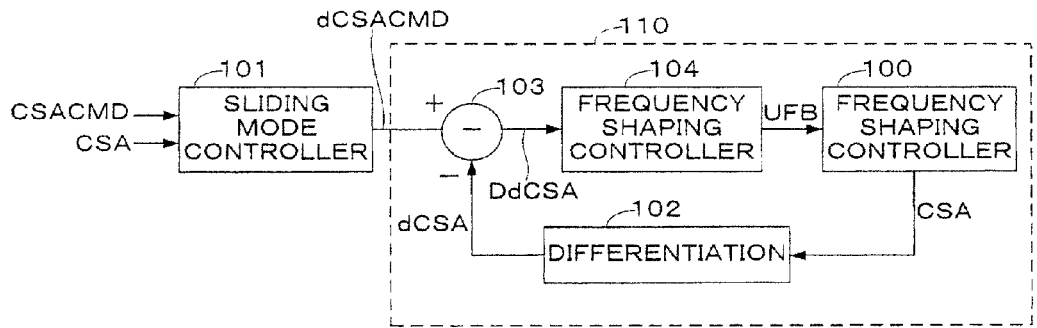
FIG. 20 is a block diagram showing a configuration of the feedback control input calculation block shown in FIG. 19.

The feedback control input calculation block 71b includes, as shown in FIG. 20, a sliding mode controller 101, a differentiation block 102, a subtracting block 103, and a frequency shaping controller 104.

The differentiation block 102 differentiates the CS angle CSA, to calculate a rate of change in the CS angle CSA (hereinafter referred to as "CS angular speed") dCSA. The sliding mode controller 101 calculates a CS angular speed command value dCSACMD which is a target value of the CS angular speed dCSA so that the CS angle CSA coincides with the CS angle command value CSACMD by the sliding mode control. The subtracting block 103 subtracts the CS angular speed dCSA from the CS angular speed command value dCSACMD, to calculate an angular speed deviation DdCSA.

The frequency shaping controller 104 calculates the feedback control input UFB so that the angular speed deviation DdCSA becomes "0" with the PI control (proportional and integral control).

It is to be noted that the feedback control input UFB is output to the motor 43 and the first valve operating characteristic varying mechanism 41, which constitute a controlled object, through the switching block 74. However in FIG. 20, a simplified configuration wherein the feedback control input UFB is directly input to the controlled object 100 is shown.

In this embodiment, a block, which consists of the differentiation block 102, the subtracting block 103, the frequency shaping controller 104, and the controlled object 100, is defined as an extended controlled object 110. A frequency shaping transfer function H(s), which is a transfer function of the frequency shaping controller 104, is set so that a transfer function FX(s) of the extended controlled object 110 coincide with a desired target transfer function F(s).

The transfer function FX(s) of the extended controlled object 110 is given by the following equation (31). G(s) is a transfer function of the controlled object 100 (hereinafter referred to as "object transfer function"), and "s" is a transfer function of the differentiation block 102.

$$FX(s) = \frac{G(s) \cdot H(s)}{1 + s \cdot G(s) \cdot H(s)} \tag{31}$$

The frequency shaping transfer function H(s), which makes the transfer function FX(s) coincide with the target transfer function F(s), is obtained as the following equation (32) by replacing FX(s) in the equation (31) with F(s) and solving the modified equation with respect to H(s).

$$H(s) = \frac{F(s)}{1 - s \cdot F(s)} \cdot \frac{1}{G(s)} \tag{32}$$

Next, an example of how the target transfer function F(s) is set will be described. The object transfer function G(s), which is a transfer function of the first valve operating characteristic varying mechanism 41 (more properly, a transfer function of a controlled object model obtained by modeling the first valve operating characteristic varying mechanism 41) can be expressed with the following equation (33). In the equation (33), "J" and "B" are constants determined by the characteristics of the motor 43 and the first valve operating characteristic varying mechanism 41, for example, a motor torque constant, a gear reduction ratio, an inertia moment of the motor 43, an inertia moment of the control shaft 56, and the like.

$$G(s) = \frac{1}{J \cdot s^2 + B \cdot s} \tag{33}$$

In order to obtain the extended controlled object 110 expressed by the similar transfer function even if there exist error factors such as a change in the dynamic characteristic of the controlled object and/or a great disturbance, the target transfer function F(s) is given, for example, by the following equation (34). Then, the frequency shaping transfer function H(s) is given by the following equation (35).

$$F(s) = \frac{1}{\tau \cdot s^2 + s} \tag{34}$$

$$H(s) = \frac{J \cdot s + B}{\tau \cdot s} \tag{35}$$

The transfer function H(s) corresponds to a transfer function of the PI (proportional and integral) control. Accordingly, the feedback control input UFB can be calculated by the same calculation as that in the feedback control input calculation block 71 in the first embodiment described above. That is, the angular speed deviation DdCSA in this embodiment corresponds to the control deviation ERR in the first embodiment. Therefore, by deleting step S11 in FIG. 7, and replacing the control deviations ERR of steps S12 and S15 with the angular speed deviations DdCSA, the feedback control input UFB can be calculated.

Next, a calculation method of the CS angular speed command value dCSACMD in the sliding mode controller 101 will be described. The CS angular speed command value dCSACMD is calculated as a sum of an equivalent control input UEQ and a reaching law control input URCH, as shown by the following equation (41).

$$dCSACMD(k) = UEQ(k) + URCH(k) \tag{41}$$

Further, by converting the transfer function F(s) of the extended controlled object 110 to a corresponding transfer function of the discrete time system and expressing the CS angle CSA(k), which is the control output, using past values of the CS angle CSA and the CS angular speed command value dCSACMD which is the control input, the following equation (42) for defining the controlled object model is obtained.

$$CSA(k) = a11 \times CSA(k-1) + a12 \times CSA(k-2) + b11 \times dCSACMD(k-1) + b12 \times dCSACMD(k-2) \tag{42}$$

where a11, a12, b11, and b12 are model parameters calculated by a well-known method using the constant τ contained in the transfer function F(s) and the control period TCAL.

Further, a switching function value σ(k) is defined by the following equation (44) using a control deviation DCSA calculated by the equation (43).

$$DCSA(k) = CSACMD(k) - CSA(k) \tag{43}$$

$$\sigma(k) = DCSA(k) + VPOLE \times DCSA(k-1) \tag{44}$$

where VPOLE is a switching function setting parameter which determines a damping characteristic of the control deviation DCSA. The switching function setting parameter VPOLW is set to a value greater than "−1" and less than "0".

The equivalent control input UEQ is a control input which satisfies the following equation (45).

$$\sigma(k) = \sigma(k+1) \tag{45}$$

By applying the equations (42), (43), and (44) to the equation (45), the following equation (46) for calculating the equivalent control input UEQ is obtained.

$$\begin{aligned}UEQ(k) = &\ (1/b11)\{(1 - a11 - VPOLE)CSA(k) + (VPOLE - a12)CSA(k-1) - \\ &\ b12 \times dCSACMD(k-1) + CSACMD(k+1) + \\ &\ (VPOLE - 1)CSACMD(k) - VPOLE \times CSACMD(k-1)\}\end{aligned} \tag{46}$$

Further, the reaching law control input URCH is calculated by the following equation (47).

$$URCH(k) = (-F/b11)\sigma(k) \tag{47}$$

where "F" is a reaching law control gain.

By configuring the control system as described above, a stable control can be performed by the sliding mode controller 101 even if error factors exist, such as a change in the dynamic characteristic of the controlled object 100, a great disturbance, and/or an influence of nonlinear elements. That is, the above error factors can be removed with the feedback control by the subtracting block 103 and the frequency shaping controller 104, thereby realizing a stable control by the sliding mode controller 101. Further, by performing the calculation in the frequency shaping controller 104 similarly to the calculation in the feedback control input calculation block 71 of the first embodiment, an effect which is the same as that of the first embodiment, can be obtained.

That is, the electric power supplied to the motor 43 can be reduced by setting the hold control input UHOLD so that the drive current IMD of the motor 43 takes an average value of the upper limit value and the lower limit value of the required current for maintaining the CS angle at a constant value. Further, by making the feedback control input UFB coincide with the corrected hold control input UHLDC when the output control input UFM is set to the corrected hold control input UHLDC, good converging performance is obtained when the CS angle command value CSACMD changes, i.e., when the output control input UFM is switched from the hold control input UHOLD to the feedback control input UFB.

In this embodiment, the feedback control input calculation block 71b corresponds to the feedback control means. That is, the sliding mode controller 101, the subtracting block 103, the frequency shaping controller 104, and the differentiation block 102 correspond to the feedback control means.

Modification

Figure 21:
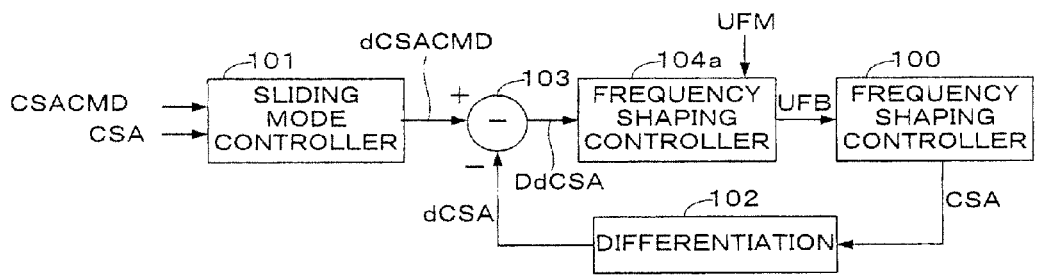
FIG. 21 is a block diagram showing a modification of the configuration shown in FIG. 19.
Figure 22:
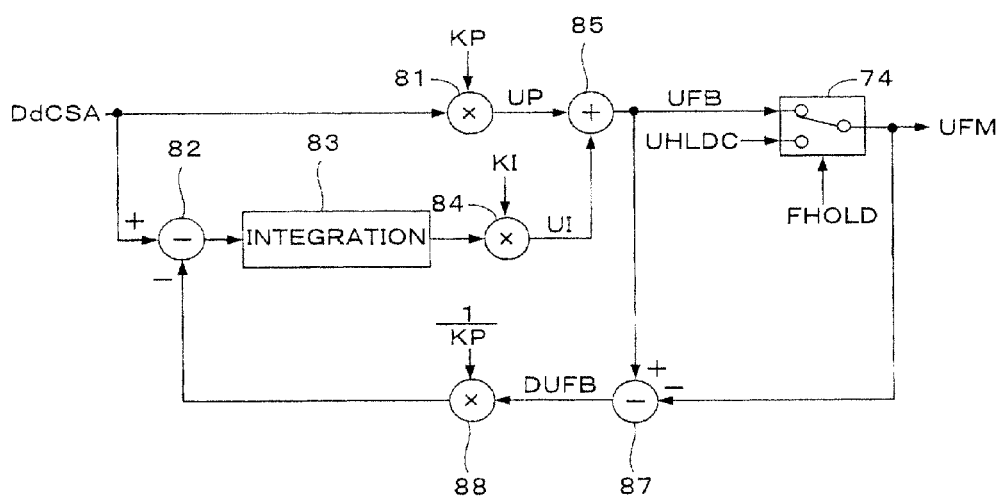
FIG. 22 is a block diagram showing a configuration of the feedback control input calculation block shown in FIG. 21.

Alternatively, the frequency shaping controller 104 may be changed to a frequency shaping controller 104a as shown in FIG. 21, and the frequency shaping controller 104a may be configured like the feedback control input calculation block 71a as shown in FIG. 22. That is, by replacing the control deviation ERR with the angular speed deviation DdCSA and inputting the angular speed deviation DdCSA to the multiplying block 81 and the subtracting block 82, the feedback control input UFB in the hold operation can be made to gradually approach the corrected hold control input UHLDC.

Fourth Embodiment

Figure 23:
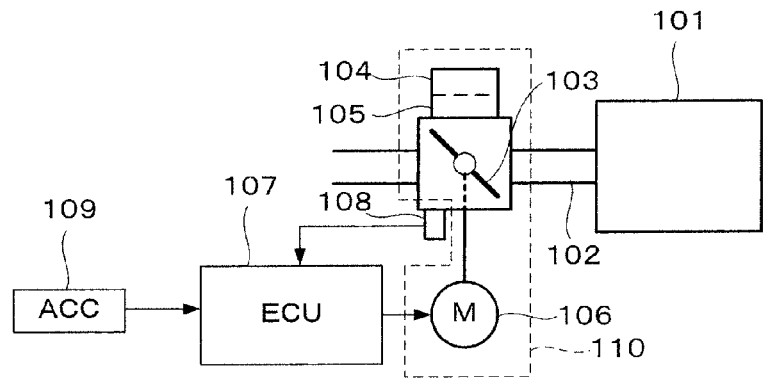
FIG. 23 shows a configuration of a control system according to a fourth embodiment of the present invention.

FIG. 23 is a diagram showing a configuration of a throttle valve actuating device and a control system therefore according to a fourth embodiment of the present invention.

A throttle valve 103 is provided in an intake passage 102 of an engine 101. A return spring 104 for biasing the throttle valve 103 in the closing direction, and a resilient member 105 for biasing the throttle valve 103 in the opening direction are mounted on the throttle valve 103. The throttle valve 103 is configured so as to be actuated by a motor 106 via a gear mechanism (not shown). The throttle valve 103, the return spring 104, the resilient member 105, the motor 106, and the gear mechanism (not shown) constitute the throttle valve actuating device 110 which is a controlled object.

The motor 106 is connected to an ECU 107 and the operation is controlled by the ECU 107. The throttle valve 103 is provided a throttle valve opening sensor 108 for detecting a throttle valve opening TH, and the detection signal is supplied to the ECU 107.

The ECU 107 is connected to an accelerator sensor 109 for detecting a depression amount ACC of an accelerator pedal indicative of a demand output of the driver of the vehicle on which the engine 101 is mounted. The detection signal of the accelerator sensor 109 is supplied to the ECU 7.

The ECU 107 includes an input circuit, a CPU, a memory circuit, an output circuit, and the like, similarly to the ECU 5 in the first embodiment. The ECU 107 calculates a target opening THR of the throttle valve 103 according to the depression amount ACC of the accelerator pedal, and calculates an control input UFM to the motor 106 so that the detected throttle valve opening TH coincides with the target opening THR. The ECU 107 supplies an electrical signal according to the control input UFM, specifically, a pulse-width modulation (PWM) signal of a duty ratio proportional to the control input UFM to the motor 106.

Figure 24:
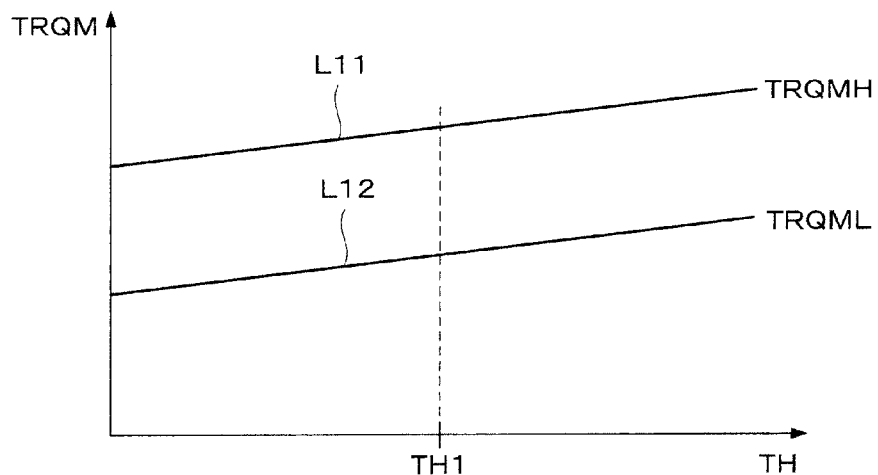
FIG. 24 shows a relationship between a throttle valve opening (TH) and an output torque (TRQM) of a motor for actuating the throttle valve.

FIG. 24 shows a relationship between the opening TH of the throttle valve 103 and an output torque TRQM of the motor 106. That is, when the throttle valve opening TH is equal to the opening TH1, the throttle valve opening TH increases if the output torque TRQM exceeds the maximum torque TRQMH shown by the solid line L11; the throttle valve opening TH decreases if the output torque TRQM becomes less than the minimum torque TRQML shown by the solid line L12; and the throttle valve opening TH is maintained at the opening TH1 if the output torque TRQM is between the maximum torque TRQMH and the minimum torque TRQML. Therefore, when the target opening THR is constant, the power consumption can be reduced by appropriately setting the hold control input UHOLD for reducing the duty ratio of the PWM signal, like the first embodiment.

Figure 25:
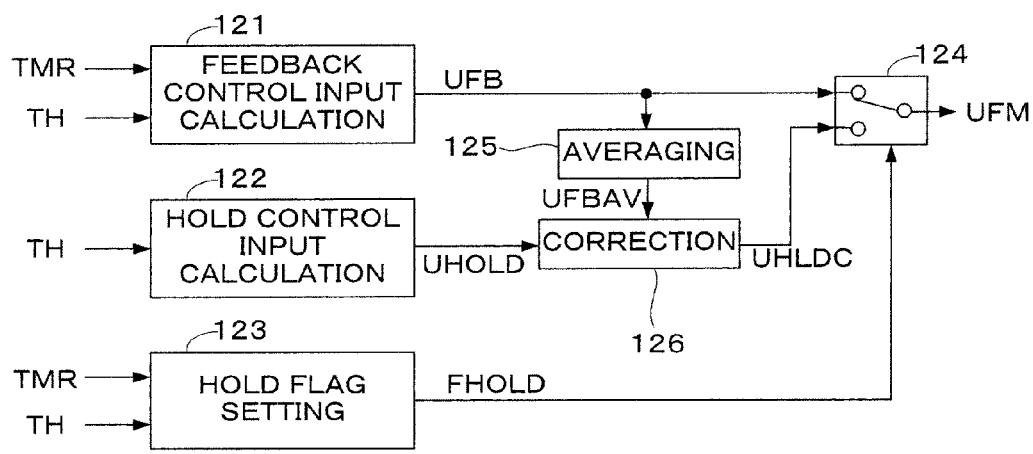
FIG. 25 is a block diagram showing a configuration of the output control input calculation module in the fourth embodiment.

FIG. 25 is a block diagram showing a configuration of an output control input calculation module in this embodiment. This module is configured similarly to that in the first embodiment, and includes a feedback control input calculation block 121, a hold control input calculation block 122, a hold flag setting block 123, a switching block 124, an averaging block 125, and a correction block 126.

The feedback control input calculation block 121 calculates the feedback control input UFB so that the detected throttle valve opening TH coincides with the target opening THR with the proportional and integral (PI) control. Specifically, the feedback control input UFB is calculated by the calculation process obtained by replacing the CS angle command value CSACMD and the CS angle CSA in the process of FIG. 7 or FIG. 13, respectively with the target opening THR and the throttle valve opening TH.

The hold control input calculation block 122 calculates the hold control input UHOLD according to the throttle valve opening TH. The hold control input UHOLD is set, for example, to a value corresponding to the average value of the maximum torque TRQMH and the minimum torque TRQML, like the first embodiment. Therefore, the hold control input UHOLD is set so as to increase as the throttle valve opening TH increases.

The hold flag setting block 123 sets the hold flag FHOLD according to the target opening THR and the throttle valve opening TH by the process similar to the process shown in FIG. 8. The averaging block 125 and the correction block 126 calculate the corrected hold control input UHLDC by the process similar to the process shown in FIG. 10. The switching block 124 selects the feedback control input UFB when the hold flag FHOLD is equal to "0; selects the hold control input UHOLD when the hold flag FHOLD is set to "1"; and outputs the selected control input as the output control input UFM.

By configuring the output control input calculation module as described above, the same effect as the first embodiment or the second embodiment is obtained.

In this embodiment, the feedback control input calculation block 121 corresponds to the feedback control means, the averaging block 125 corresponds to the averaging means, the hold control input calculation block 122 corresponds to the hold control input calculating means, the correction block 126 corresponds to the corrected hold control input calculating means, and the hold flag setting block 123 and the switching block 124 correspond to the control input setting means.

Other Embodiments

The present invention is not limited to the embodiments described above, and various modifications may be made. For example, in the above-described embodiments, the preset ratio KR is initially set to "0" and is made to increase with the time elapsing. Alternatively, a characteristic change in the controlled object may be detected, and the preset ratio KR may be made to increase according to the detected result of the characteristic change in the controlled object as described below.

If the hold flag FHOLD is returned to "0" after the hold flag FHOLD is set to "1", although the control target value (CSACMD) is maintained at the same value, it is determined that the characteristic of the controlled object has changed (the characteristic change determination condition is satisfied), and the preset ratio KR is made to increase by a predetermined amount ΔKR (for example, 0.1). Thereafter, when the characteristic change determination execution condition is satisfied, the preset ratio KR is made to increase by the predetermined amount ΔKR. With this setting method, the preset ratio KR can be set to an appropriate value according to the change in the characteristic of the controlled object.

The present invention is not limited to the embodiments described above, and is applicable also to various controls, particularly to a positioning control of a controlled object including an element with large friction. For example, the present invention is applicable to a positioning device using a ball screw (for example, used in a machine tool or the like), a valve timing varying device using an electromagnetic clutch, a shift fork positioning device of an automatic transmission, and the like.

Further, in the first to fourth embodiments described above, the hold control input UHOLD applied during the hold operation is set so that the drive current IMD of the motor 43 is set to an average value of the upper limit value and the lower limit value of the current required for holding. Alternatively, the drive current IMD may be set to a value which greater than the minimum current value and less than the average value. By such setting of the drive current, the power consumption of the motor 43 can be further reduced.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

I claim:

1. A control system for a plant, said control system comprising:
    feedback control means for calculating a feedback control input so that a controlled output of said plant coincides with a target value;
    averaging means for averaging the feedback control input to calculate an averaged feedback control input;
    hold control input calculating means for calculating a hold control input according to an operating condition of said plant;
    corrected hold control input calculating means for calculating a corrected hold control input by combining the hold control input with the averaged feedback control input according to a preset ratio; and
    control input setting means for setting a control input to said plant to the feedback control input in a first state where a control deviation between the controlled output and the target value is greater than a predetermined threshold value, and setting the control input to the corrected hold control input in a second state where the control deviation is equal to or less than the predetermined threshold value,
    wherein the feedback control means is also for making the feedback control input gradually approach to or coincide with the corrected hold control input in the second state.

2. A control system according to claim 1, wherein the feedback control means is also for calculating the feedback control input using a proportional term and an integral term according to the control deviation, and for calculating the integral term using a control input deviation which is a difference between the feedback control input and the corrected hold control input, in the second state.

3. A control system according to claim 1, wherein said plant comprises a valve operating characteristic varying mechanism which continuously changes a lift amount of at least one intake valve of an internal combustion engine, and the valve operating characteristic varying mechanism has a control shaft for changing the lift amount and an actuator for rotating the control shaft,
    wherein a value of an electric current supplied to said actuator is calculated according to the control input, and the controlled output is a rotational angle of the control shaft.

4. A control method for a plant, said method comprising:
    a) calculating a feedback control input so that a controlled output of said plant coincides with a target value;
    b) averaging the feedback control input to calculate an averaged feedback control input;
    c) calculating a hold control input according to an operating condition of said plant;
    d) calculating a corrected hold control input by combining the hold control input with the averaged feedback control input according to a preset ratio; and
    e) setting a control input to said plant to the feedback control input in a first state where a control deviation between the controlled output and the target value is greater than a predetermined threshold value, and setting the control input to the corrected hold control input in a second state where the control deviation is equal to or less than the predetermined threshold value,
    wherein the feedback control input is made to gradually approach to or coincide with the corrected hold control input in the second state.

5. A control method according to claim 4, wherein the feedback control input is calculated using a proportional term and an integral term according to the control deviation, and calculates the integral term using a control input deviation which is a difference between the feedback control input and the corrected hold control input, in the second state.

6. A control method according to claim 4, wherein said plant comprises a valve operating characteristic varying mechanism which continuously changes a lift amount of at least one intake valve of an internal combustion engine, and the valve operating characteristic varying mechanism has a control shaft for changing the lift amount and an actuator for rotating the control shaft,
    wherein a value of an electric current supplied to said actuator is calculated according to the control input, and the controlled output is a rotational angle of the control shaft.

7. A computer program embodied on a computer-readable storage medium for causing a computer to implement a control method for a plant, said control method comprising:
    a) calculating a feedback control input so that a controlled output of said plant coincides with a target value;

b) averaging the feedback control input to calculate an averaged feedback control input;
c) calculating a hold control input according to an operating condition of said plant;
d) calculating a corrected hold control input by combining the hold control input with the averaged feedback control input according to a preset ratio; and
e) setting a control input to said plant to the feedback control input in a first state where a control deviation between the controlled output and the target value is greater than a predetermined threshold value, and setting the control input to the corrected hold control input in a second state where the control deviation is equal to or less than the predetermined threshold value,
wherein the feedback control input is made to gradually approach to or coincide with the corrected hold control input in the second state.

8. A computer program according to claim 7, wherein the feedback control input is calculated using a proportional term and an integral term according to the control deviation, and calculates the integral term using a control input deviation which is a difference between the feedback control input and the corrected hold control input, in the second state.

9. A computer program according to claim 7, wherein said plant comprises a valve operating characteristic varying mechanism which continuously changes a lift amount of at least one intake valve of an internal combustion engine, and the valve operating characteristic varying mechanism has a control shaft for changing the lift amount and an actuator for rotating the control shaft,
wherein a value of an electric current supplied to said actuator is calculated according to the control input, and the controlled output is a rotational angle of the control shaft.

10. A control system for a plant, said control system comprising:
a feedback controller configured to calculate a feedback control input wherein a controlled output of the plant coincides with a target value;
an averaging unit configured to average the feedback control input to calculate an averaged feedback control input;
a hold control input calculator configured to calculate a hold control input according to an operation condition of the plant;
a corrected hold control input calculator configured to calculate a corrected hold control input by combining the hold control input with the averaged feedback control input according to a preset ratio; and
a control input setting unit configured to set a control input to the plant to the feedback control input in a first state where a control deviation between the controlled output and the target value is greater than a predetermined threshold value, and also configured to set the control input to the corrected hold control input in a second state where the control deviation is equal to or less than the predetermined threshold value,
wherein the feedback controller is configured to make the feedback control input gradually approach to or coincide with the corrected hold control input in the second state.

11. A control system according to claim 10, wherein the feedback control is also configured to calculate the feedback control input using a proportional term and an integral term according to the control deviation, and configured to calculate the integral term using a control input deviation which is a difference between the feedback control input and the corrected hold control input, and the second state.

12. A control system according to claim 10, wherein the plant comprises a valve operating characteristic varying mechanism which continuously changes a lift amount of at least one intake valve of an internal combustion engine, and the valve operating characteristic varying mechanism has a control shaft for changing the lift amount and an actuator for rotating the control shaft,
wherein a value of an electric current supply to the actuator is calculated according to the control input, and the controlled output is a rotational angle of the control shaft.

* * * * *